United States Patent
Goldman et al.

(10) Patent No.: US 10,327,014 B2
(45) Date of Patent: Jun. 18, 2019

(54) THREE-DIMENSIONAL TELEPRESENCE SYSTEM

(71) Applicant: Google LLC, Mountain View, CA (US)

(72) Inventors: Daniel Goldman, Seattle, WA (US); Jason Lawrence, Seattle, WA (US); Andrew Huibers, Los Altos, CA (US); Andrew Ian Russell, San Jose, CA (US); Steven M. Seitz, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/699,651

(22) Filed: Sep. 8, 2017

(65) Prior Publication Data
US 2018/0077384 A1  Mar. 15, 2018

Related U.S. Application Data

(60) Provisional application No. 62/385,685, filed on Sep. 9, 2016.

(51) Int. Cl.
| | |
|---|---|
| *G02F 1/29* | (2006.01) |
| *H04N 7/14* | (2006.01) |
| *H04N 7/15* | (2006.01) |
| *H04R 1/02* | (2006.01) |
| *H04R 3/00* | (2006.01) |

(Continued)

(52) U.S. Cl.
CPC ....... *H04N 21/222* (2013.01); *G02B 27/0101* (2013.01); *G02F 1/29* (2013.01);
(Continued)

(58) Field of Classification Search
CPC combination set(s) only.
See application file for complete search history.

(56) References Cited

U.S. PATENT DOCUMENTS

| | | |
|---|---|---|
| 2006/0007222 A1 | 1/2006 | Uy |
| 2009/0146915 A1 | 6/2009 | Marathe |
| | (Continued) | |

FOREIGN PATENT DOCUMENTS

| | | |
|---|---|---|
| EP | 2451176 A2 | 5/2012 |
| WO | 2016/025962 A1 | 2/2016 |

OTHER PUBLICATIONS

International Search Report and Written Opinion for PCT Patent Application No. PCT/US2017/050739, dated Dec. 15, 2017, 12 pages.

(Continued)

*Primary Examiner* — Phung-Hoang J Nguyen
(74) *Attorney, Agent, or Firm* — Brake Hughes Bellermann LLP

(57) ABSTRACT

An example telepresence terminal includes a lenticular display, an image sensor, an infrared emitter, and an infrared depth sensor. The terminal may determine image data using visible light emitted by the infrared emitter and captured by the image sensor and determine depth data using infrared light captured by the infrared depth sensor. The terminal may also communicate the depth data and the image data to a remote telepresence terminal and receive remote image data and remote depth data. The terminal may also generate a first display image using the lenticular display based on the remote image data that is viewable from a first viewing location and generate a second display image using the lenticular display based on the remote image data and the remote depth data that is viewable from a second viewing location.

16 Claims, 15 Drawing Sheets

(51) Int. Cl.

| | | |
|---|---|---|
| *G02B 27/01* | (2006.01) | |
| *H04N 21/41* | (2011.01) | |
| *H04N 21/43* | (2011.01) | |
| *H04N 21/61* | (2011.01) | |
| *H04N 13/305* | (2018.01) | |
| *H04N 21/222* | (2011.01) | |
| *H04N 21/239* | (2011.01) | |
| *H04N 21/242* | (2011.01) | |
| *H04N 21/431* | (2011.01) | |
| *H04N 21/854* | (2011.01) | |
| *H04N 21/2187* | (2011.01) | |
| *H04N 21/2343* | (2011.01) | |
| *H04N 21/2365* | (2011.01) | |
| *H04N 21/4223* | (2011.01) | |

(52) U.S. Cl.
CPC ............ *H04N 7/142* (2013.01); *H04N 7/147* (2013.01); *H04N 7/157* (2013.01); *H04N 13/305* (2018.05); *H04N 21/2187* (2013.01); *H04N 21/2365* (2013.01); *H04N 21/2393* (2013.01); *H04N 21/234363* (2013.01); *H04N 21/242* (2013.01); *H04N 21/4223* (2013.01); *H04N 21/4302* (2013.01); *H04N 21/4316* (2013.01); *H04N 21/6125* (2013.01); *H04N 21/85406* (2013.01); *H04R 1/028* (2013.01); *H04R 3/005* (2013.01); *G02B 2027/014* (2013.01); *G02F 2001/291* (2013.01); *H04N 21/4113* (2013.01); *H04R 2430/20* (2013.01); *H04R 2499/15* (2013.01)

(56) References Cited

U.S. PATENT DOCUMENTS

| | | | |
|---|---|---|---|
| 2011/0164188 A1 | 7/2011 | Karaoguz et al. | |
| 2013/0187835 A1* | 7/2013 | Vaught | G06K 9/00604 345/8 |
| 2013/0278597 A1 | 10/2013 | Sasaki | |
| 2014/0098183 A1 | 4/2014 | Smith et al. | |
| 2014/0341285 A1* | 11/2014 | Sakurai | H04N 19/597 375/240.12 |
| 2014/0366803 A1* | 12/2014 | Yamada | C23C 16/52 118/713 |
| 2015/0042743 A1* | 2/2015 | Cullen | H04N 7/141 348/14.02 |
| 2015/0065113 A1* | 3/2015 | Liu | H04W 52/0254 455/418 |
| 2015/0078556 A1* | 3/2015 | Shenoy | H04S 7/302 381/56 |
| 2015/0244984 A1* | 8/2015 | Zhang | H04N 13/0059 348/14.07 |
| 2016/0078803 A1* | 3/2016 | Kim | G09G 3/007 345/694 |
| 2016/0165213 A1* | 6/2016 | Lee | G01S 17/89 348/46 |
| 2016/0335780 A1* | 11/2016 | Tsuji | G06T 7/204 |
| 2017/0070804 A1* | 3/2017 | Lee | H04R 1/1041 |
| 2017/0085834 A1* | 3/2017 | Kim | H04L 51/10 |
| 2017/0126982 A1* | 5/2017 | Suh | H04N 5/23293 |
| 2017/0176818 A1* | 6/2017 | Shi | G02F 1/134309 |
| 2017/0329413 A1* | 11/2017 | Kramer | H04L 67/025 |
| 2018/0066953 A1* | 3/2018 | Kimia | G06F 3/016 |

OTHER PUBLICATIONS

Mueller et al., "3D Video Formats and Coding Methods", Proceedings of IEEE 17th International Conference on Image Processing, Sep. 26-29, 2010, pp. 2389-2392.

Smolic et al., "An Overview of Available and Emerging 3D Video Formats and Depth Enhanced Stereo As Efficient Generic Solution", Picture Coding Symposium, 2009, 4 pages.

* cited by examiner

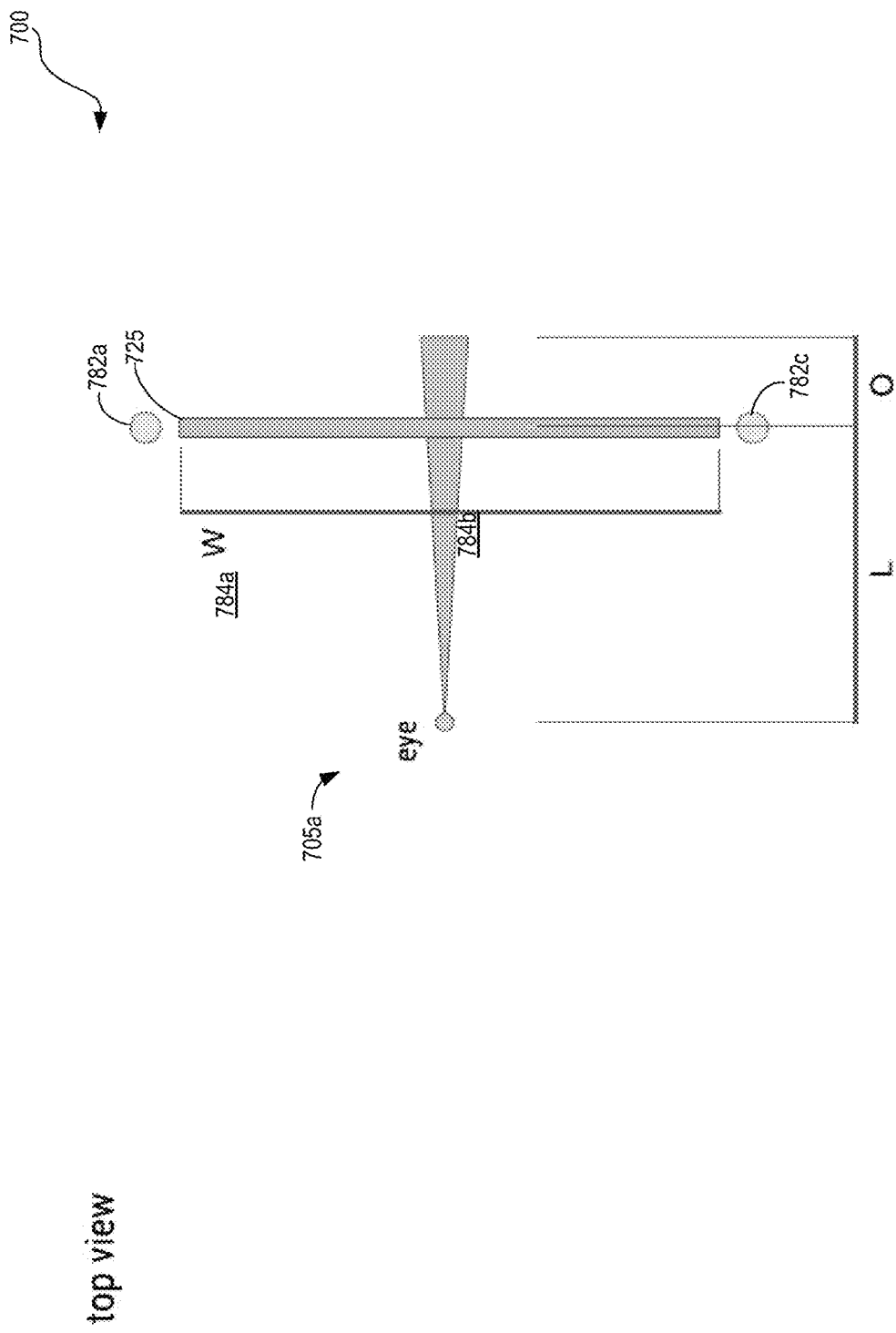

THREE-DIMENSIONAL TELEPRESENCE SYSTEM

CROSS-REFERENCE TO RELATED APPLICATIONS

This application claims priority to U.S. Provisional Application No. 62/385,685, titled THREE-DIMENSIONAL TELEPRESENCE SYSTEM and filed on Sep. 9, 2016, the entire contents of which are hereby incorporated herein by reference.

BACKGROUND

Conferencing systems, such as video conferencing systems, are used in a variety of settings to provide opportunities for participants to conduct virtual meetings without having to be co-located. Videoconferencing systems, for example, can provide a display, communications link, speakers, and microphones that allow participants to see and communicate with remote participants. Because participants can see each other as they speak, videoconferencing systems can provide for better understanding of discussed topics than written or verbal communication alone. Such videoconferencing systems can also provide for easier scheduling of meetings as not all participants need to be co-located. Further, videoconferencing systems can reduce waste of resources (e.g., time and money) by eliminating the need for travel. Traditional videoconferencing systems typically include a communications system (e.g., a telephone, VoIP system, or the like), a standard video monitor (e.g., a CRT, plasma, HD, LED, or LCD display), a camera, a microphone and speakers.

SUMMARY

Implementations of the following disclosure relate to videoconferencing and telepresence systems. At least some implementations provide for three-dimensional telepresence without the use of a head-mounted display, headphones, and/or any other types of physical encumbrances.

In one aspect, a telepresence terminal includes a display that has a microlens array disposed in front of a grid of pixels. The terminal may also include an image sensor, an infrared emitter, and an infrared depth sensor. The terminal may further include a processing device and a memory storing instructions. The instructions, when executed, may cause the processing device to perform operations including: determining image data based on visible light captured by the image sensor and determining depth data based on infrared light transmitted by the infrared emitter and captured by the infrared depth sensor. The operations may also include communicating the depth data and the image data to a remote telepresence terminal and receiving remote image data and remote depth data, the remote image data and remote depth data originating from a remote telepresence terminal. The operations may further include generating a first display image based on the remote image data using a first subset of pixels of the grid of pixels that is viewable through the microlens array from a first viewing location, and generating a second display image based on the remote image data and the remote depth data using a second subset of pixels of the grid of pixels that is viewable through the microlens array from a second viewing location.

In some implementations the first display image and the second display image may be generated to have differences that simulate parallax based on the received depth data. In this regard the instructions can further cause the processing device to perform operations comprising determining a location of a user of the telepresence terminal. The location of the user of the telepresence terminal can for example be determined based on the depth data and/or based on the image data. For example, the first display image and the second display image may be generated to have differences that simulate parallax based on the determined location of the user.

In some implementations the instructions may further cause the processing device to perform operations comprising generating a three-dimensional stereoscopic image on the display using the remote image data and the remote depth data as well as the determined location of the user of the telepresence terminal.

In some implementations, which can be combined with the above stated implementations, the instructions may further cause the processing device to perform operations comprising generating a first portion of the first display image in a first direction and generating a second portion of the second display image in a second direction. For example, microlenses of the microlens array can be configured to transmit light across one or more angles and/or to display different pixel values in one or more different directions. The first direction may be determined based on the first location and the second direction may be determined based on the second location.

In some implementations the instructions may further cause the processing device to perform operations comprising determining the depth data based on a time-of-flight method which measures a phase offset between a first infrared light transmitted by the infrared emitter and a second infrared light reflected by an object in a path of the transmitted first infrared light and captured by the infrared depth sensor.

In some implementations the telepresence terminal may further comprise a microphone assembly including a first microphone positioned on a first side of the display and a second microphone positioned on a second side of the display; and a speaker assembly including a first speaker positioned on the first side of the display and a second speaker positioned on the second side of the display. In such an implementation, the instructions may further cause the processing device to perform operations comprising capturing directional audio data using the microphone assembly; transmitting the directional audio data to the remote terminal; receiving remote directional audio data from the remote terminal; and outputting audio using the speaker assembly based on the remote directional audio data.

The telepresence terminal may include a camera assembly comprising at least one camera unit which includes the image sensor, the infrared emitter and the infrared depth sensor. The at least one camera unit may be positioned behind the display, when the display is transparent. In case of a transparent display, the display may be switchable between an off state and an illuminating state, wherein the instructions further cause the processing device to perform operations comprising synchronizing capture of visible light and infrared light with the off state of the display. In such an implementation the microlenses of the microlens array may be made of a first material and a second material, wherein the first material is a material that is substantially unaffected by electrical current while the second material is substantially affected by an electrical current and wherein the first material and the second material have different indices of refraction when no current is applied to the first and second materials.

In some implementations the telepresence terminal may comprise a beam splitter splitting incoming light and sending it to the image sensor and the infrared depth sensor. The beam splitter may thus split incoming light so that the image sensor and the infrared depth sensor receive the same light.

In another aspect, a method includes generating first infrared light using an infrared emitter. The method also includes receiving second infrared light using an infrared depth sensor. The second infrared light may be caused by reflections of the emitted first infrared light. The method may also include determining captured depth data based on the first infrared light and the second infrared light and determining captured image data based on visible light captured by an image sensor. The method may also include communicating the captured depth data and the captured image data to a remote terminal. The method may further include generating a first display image based on received image data originating from the remote terminal using a first subset of a grid of pixels, the first display image being viewable through a microlens array from a first location, and generating a second display image based on the received image data and received depth data originating from the remote terminal using a second subset of a grid of pixels, the second display image being viewable through the microlens array from a second location.

In another aspect, a non-transitory computer-readable storage medium includes instructions stored thereon that, when executed by at least one processor, are configured to cause a computing system to at least generate first infrared light using an infrared emitter, receive second infrared light using an infrared depth sensor, determine depth data based on the first infrared light and the second infrared light, determine image data based on visible light captured by an image sensor, communicate the depth data and the image data to a remote telepresence terminal, generate using a lenticular display a first display image based on received image data originating from the remote terminal, the first display image being viewable from a first location, and generate using the lenticular display a second display image based on the received image data and received depth data originating from the remote terminal, the second display image being viewable from a second location. The received depth data may originate from the remote terminal.

Other implementations of this aspect include corresponding computer systems, apparatus, and computer programs recorded on one or more computer storage devices, each configured to perform the operations of the method summarized above.

In one aspect, a local terminal in a telepresence system includes a display. The display includes a microlens array in front of a grid of pixels. The local terminal further includes one or more camera units. The camera units may include a lens, an image sensor, an infrared emitter, and an infrared depth sensor. The local terminal further includes a processing device and a memory storing instructions that when executed cause the processing device to perform operations. The operations can include determining local image data based on visible light captured by the image sensor at the local terminal and determining local depth data based on infrared light captured by the infrared depth sensor at the local terminal. The local depth data can be based on a location of a viewer with respect to the local terminal. The operations can also include communicating the local depth data and the local image data to a remote video conference terminal. The operations can also include generating a first portion of a first image in a first direction through microlenses of the microlens array based on remote image data and local location data (e.g., local depth data). Location data can be referred to as location-position data. The remote image data can originate from the remote video conference terminal and can be based on remote depth data. The operations can also include generating a second image in a second direction through the microlenses of the microlens array based on the remote image data and the local location data. The local location data can originate from the local video conference terminal. The first and second directions can differ dependent on the local location data. For example, the first direction can be a direction that is viewable from a first location (e.g., a user's first eye) and the second direction can be a direction that is viewable from a second location (e.g., a user's second eye). In some implementations, the terminal can include multiple camera units that can each include one or more lenses. In some implementations, portions of one or more images can be generated on each microlens of the microlens array. In some implementations, the first direction can be determined by selecting a first pixel from a plurality of pixels to display a portion of the first image and the second direction can be determined by selecting a second pixel from the plurality of pixels to display a portion of the second image.

In some implementations of this aspect, the local location data includes location data corresponding to the user of the local terminal. In some implementations, location data can include depth data.

Other implementations of this aspect include corresponding methods configured to perform the operations of the processing device according to the instructions stored in the video conference system's memory.

In another aspect, a method for providing three-dimensional telepresence includes generating first infrared light using an infrared emitter and receiving second infrared light using an infrared depth sensor. Captured depth data can be determined based on the first infrared light and the second infrared light, and captured image data can be determined based on visible light captured by an image sensor. The captured depth data and the captured image data can be communicated to a remote video conference terminal. A first image is generated in a first direction through a microlens of a microlens array of a local terminal based on received image data originating from the remote video conference terminal, and a second image is generated through the microlens of the microlens array of the local terminal based on the received image data originating from the remote video conference terminal and based on location data corresponding to a user of the local terminal. The first image and the second image differ dependent on the location data.

In some implementations of this aspect, generating the first image and/or second image through the microlens of the microlens array is further based on the location data corresponding to the user whose image was captured by the image sensor.

The details of one or more implementations are set forth in the accompanying drawings and the description below. Other features will be apparent from the description and drawings, and from the claims.

BRIEF DESCRIPTION OF THE DRAWINGS

FIGS. 7A through 7G are depth and projection examples according to implementations.

Like reference symbols in the various drawings indicate like elements.

DETAILED DESCRIPTION

Figure 1:
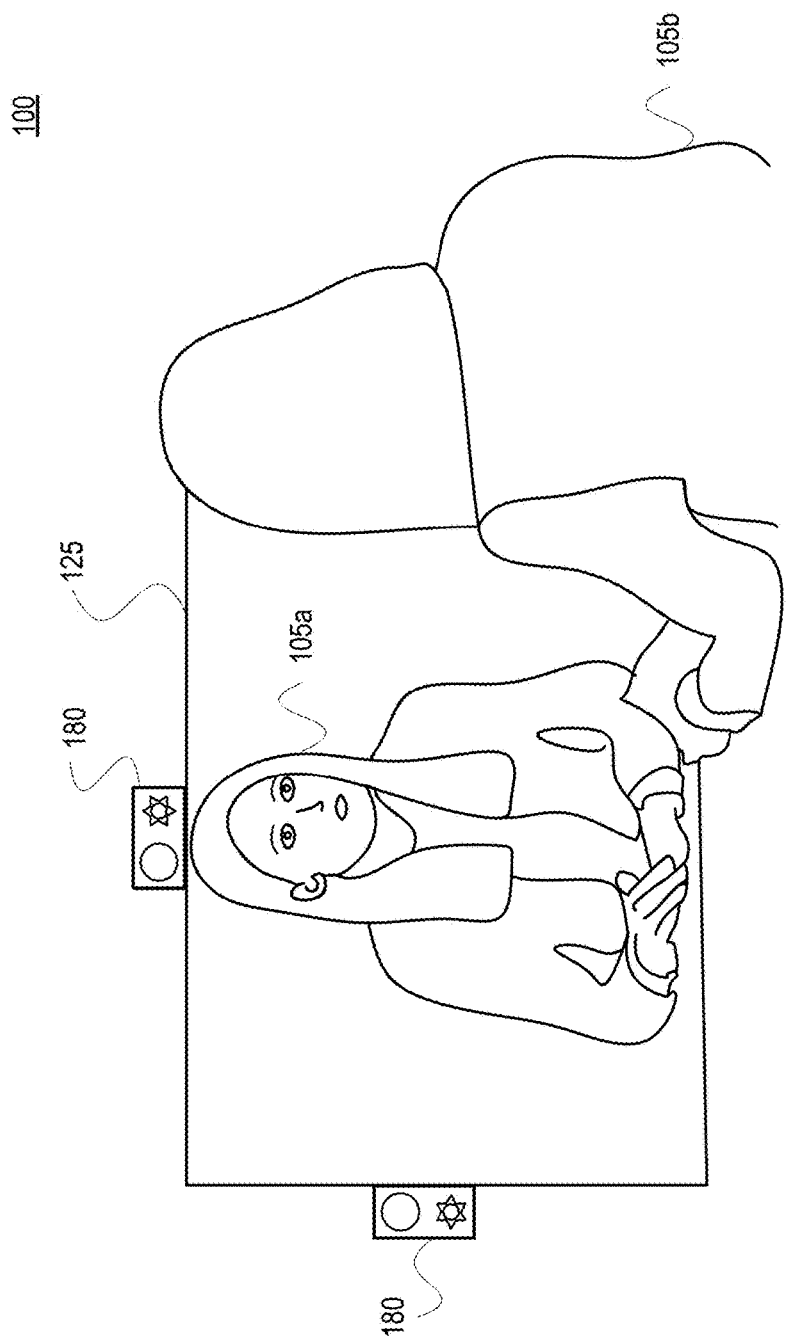
FIG. 1 shows an example video conferencing system consistent with disclosed implementations.

While traditional videoconferencing systems provide an experience that is closer to a face-to-face meeting than a teleconference (e.g., without video), traditional videoconferencing systems have limitations which detract from a "real life" meeting experience. For example, displays in traditional videoconferences present images in two dimensions and have limited ability to render realistic depth. As a result, participants in a videoconference do not have a sense of co-presence with the other participant. In addition, cameras in traditional videoconferencing systems disposed in a manner such that participants are not able to engage in direct eye contact—each participant may be looking directly at their display, while the camera does not capture participant images through the display. While some videoconferencing systems provide a virtual-reality like experience for videoconferencing, such videoconferencing systems require participants to wear head-mounted displays, goggles, or 3-D glasses to experience rendering of three-dimensional images.

Accordingly, the implementations disclosed herein are related to a three-dimensional telepresence system providing a more realistic face-to-face experience than traditional videoconferencing systems without the use of head-mounted displays and 3-D glasses. Videoconferencing and image conferencing systems are some examples of telepresence systems. Consistent with disclosed implementations, a three-dimensional telepresence system can include a glasses-free lenticular three-dimensional display that includes a plurality of microlens in a microlens array. According to some implementations, the microlens array may include a plurality of groups (or sub-arrays) of microlenses, each of the plurality of groups (or sub-arrays) includes several microlenses each configured to transmit light across one or more angles and/or each can be configured to display different color pixel values (e.g., RGB pixel values) in one or more different directions. The use of microlens groups/sub-arrays can be included in a display to show different images at different viewing angles (i.e., that are viewable from different viewing locations). In some implementations of the three-dimensional telepresence system, each of the plurality of microlens groups includes at least two microlenses, and three-dimensional imagery can be produced by projecting a portion (e.g., a first pixel) of a first image in a first direction through the at least one microlens and projecting a portion (e.g., a second pixel) of a second image in a second direction through the at least one other microlens. The second image may be similar to the first image, but the second image may be shifted to simulate parallax thereby creating a three-dimensional stereoscopic image for the viewer.

The three-dimensional telepresence systems disclosed herein can also include a camera assembly having one or multiple camera units. Each camera unit may include an image sensor for capturing visible light (e.g., color), an infrared emitter, and an infrared depth sensor for capturing infrared light originating from the infrared emitter and reflected off the viewer and the objects surrounding the viewer. In some implementations, one or more of the components of the camera unit (e.g., image sensor, infrared emitter, and infrared depth sensor) may not be co-located. In some implementations, a first terminal of the three-dimensional telepresence system can use a combination of the captured visible light and captured infrared light to generate first terminal image data and first terminal depth data, which is communicated to a second terminal of the three-dimensional telepresence system. In some implementations, the first terminal of the three-dimensional telepresence system can receive second terminal image data and second terminal depth data from the second terminal of the three-dimensional telepresence system, and use the second terminal image data and the second terminal depth data, as well as location data relating to the location of a user with respect to the first terminal (e.g., determined based on the first terminal depth data), to generate three-dimensional stereoscopic images on the display of the first terminal.

One example implementation of three-dimensional telepresence system 100 is shown in in FIG. 1. Two users 105a and 105b can use three-dimensional telepresence system 100 to communicate remotely but still face-to-face. A first user 105a is at a remote location from a second user 105b. The second user 105b sees a three-dimensional graphic image of the first user 105a on display 125. In some implementations, display 125 is at a distance from second user 105b and of an appropriate size to simulate co-presence of first user 105a and second user 105b. For example, display 125 may be positioned 1 m across the table from second user 105b, and display 125 may be a 1 m display. Camera assembly 180 can be configured to capture visible light and infrared light which can be used by the three-dimensional telepresence system 100 (e.g., by the terminal used by second user 105b) to display a three-dimensional stereoscopic image of second user 105b on a display viewable by first user 105a (which is not shown in FIG. 1). In some implementations, one or more microphones and/or speakers (e.g., speaker arrays) can be included in the system 100. In such systems 100, the microphone(s) and/or speaker(s) can be used to simulate spatial audio (e.g., sounds being produced spatially dependent on location of origin).

Figure 2:
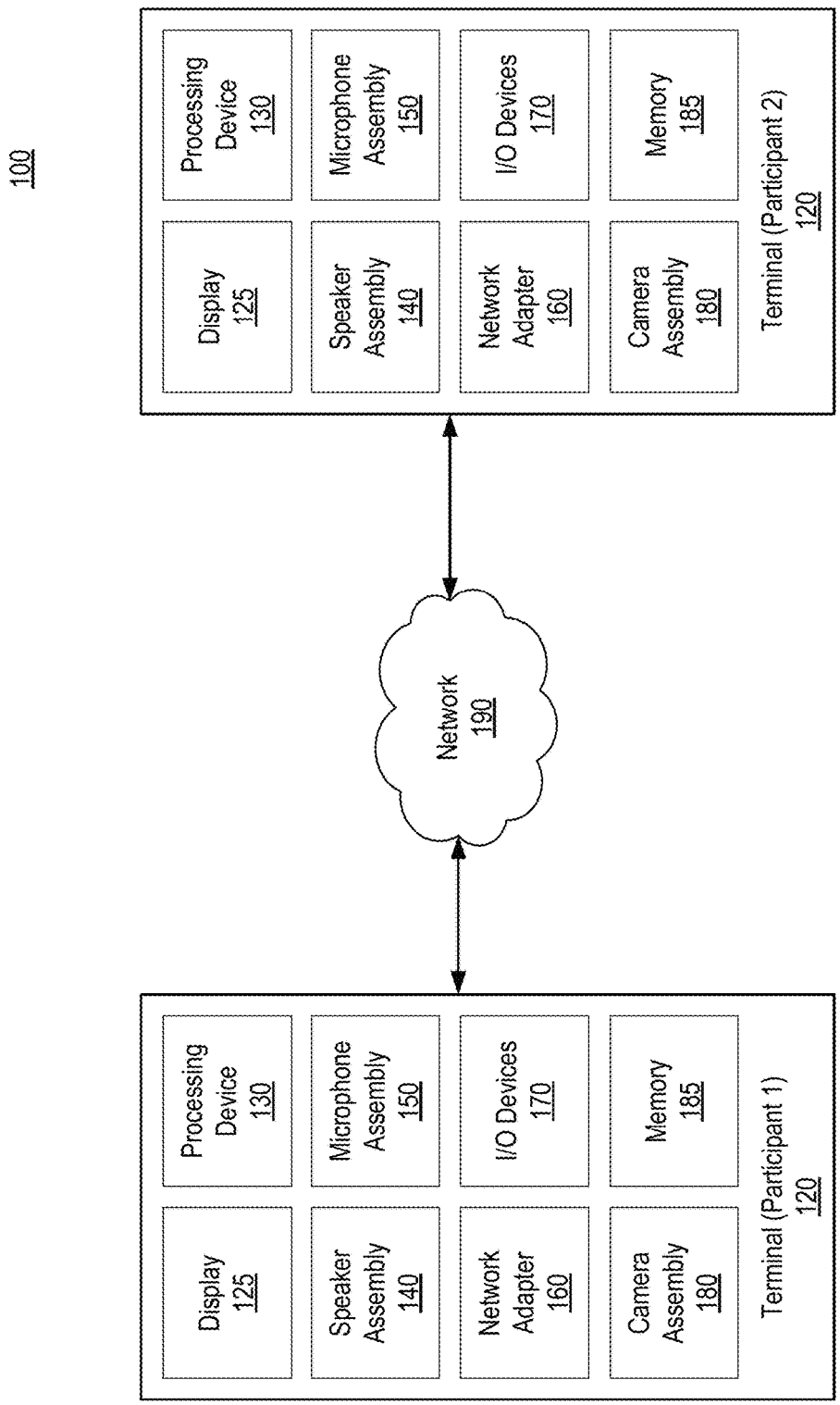
FIG. 2 shows an example video conference system consistent with disclosed implementations.

FIG. 2 illustrates, in block form, three-dimensional telepresence system 100 for conducting three-dimensional video conferencing between two users. In the implementation illustrated in FIG. 2, each terminal 120, corresponding to respective users (e.g., a first participant and a second participant) can communicate using network 190.

Three-dimensional telepresence system 100 shown in FIG. 2 can be computerized, where each of the illustrated components includes a computing device, or part of a computing device, that is configured to communicate with other computing devices via network 190. For example, each terminal 120 can include one or more computing devices, such as a desktop, notebook, or handheld computing device that is configured to transmit and receive data to/from other computing devices via network 190. In some implementations, each terminal 120 may be a special purpose teleconference device where each component of terminal 120 is disposed within the same housing. In some implementations, communication between each terminal 120 may be facilitated by one or more servers or computing clusters (not shown) which manage conferencing set-up, tear down, and/or scheduling. In some implementations, such as the implementation shown in FIG. 2, terminals 120 may communicate using point-to-point communication protocols.

In the implementation shown in FIG. 2, terminal 120 can be used by participants in a videoconference. In some implementations, the participants use identical terminals. For example, each participant may use the same model number of terminal 120 with the same configuration or specification, or terminals 120 that have been configured in a similar way to facilitate communication during the video conference. In some implementations, terminals used by participants may differ but are each configured to send and receive image and depth data and generate three-dimensional stereoscopic images without the use of head-mounted displays or three-dimensional glasses. For ease of discussion, the implementation of FIG. 2 presents identical terminals 120 on both ends of three-dimensional telepresence system 100.

In some implementations, terminal 120 includes display 125. In some implementations, display 125 can include a glasses-free lenticular three-dimensional display. Display 125 can include a microlens array that includes a plurality of microlenses. In some implementations, the microlenses of the microlens array can be used to generate a first display image viewable from a first location and a second display image viewable from a second location. A stereoscopic three-dimensional image can be produced by display 125 by rendering the first display image on a portion of a grid of pixels so as to be viewed through the microlens array from a first location corresponding to the location of a first eye of the user and a second display image on a portion of the grid of pixels so as to be viewed through the microlens array from a second location corresponding to the location of a second eye of the user such that the second display image represents a depth shift from the first display image to simulate parallax. For example, the grid of pixels may display a first display image intended to be seen through the microlens array by the left eye of a participant and the grid of pixels may display a second display image intended to be seen through the microlens array by the right eye of the participant. The first and second locations can be based on a location (e.g., a lateral/vertical location, a position, a depth, a location of a left or right eye) of the viewer with respect to the display. In some implementations, first and second directions for generating the first and second display images can be determined by selecting certain pixels from an array of pixels associated with the microlens array.

In some implementations, the microlens array can include a plurality of microlens pairs that include two microlenses, and display 125 may use at least two of the microlenses for displaying images. In some implementations, processing device 130 may select a set of outgoing rays through which an image may be viewed through the microlenses to display a left eye image and right eye image based on location information corresponding to the position of the participant relative to display 125 (the location may be captured by camera assembly 180 consistent with disclosed implementations). In some implementations, each of a plurality of microlenses can cover (e.g., can be disposed over or associated with) some number of pixels, such that each pixel is visible from some limited subset of directions in front of the display 125. If the location of the observer is known, the subset of pixels under each lens (across the entire display 125) that is visible from one eye, and the subset of pixels across the display 125 that is visible from the other eye can be identified. By selecting for each pixel the appropriate rendered image corresponding to the virtual view that would be seen from the user's eye locations, each eye can view the correct image.

The processing device 130 may include one or more central processing units, graphics processing units, other types of processing units, or combinations thereof.

In some implementations, the location of the user with respect to the terminal, to determine a direction for simultaneously projecting at least two images to the user of the terminal via the microlenses, can be determined using a variety of mechanisms. For example, an infrared tracking system can use one or more markers coupled to the user (e.g., reflective markers attached to glasses or headwear of the user). As another example, an infrared camera can be used. The infrared camera can be configured with a relatively fast face detector that can be used to locate the eyes of the user in at least two images and triangulate location in 3D. As yet another example, color pixels (e.g., RGB pixels) and a depth sensor can be used to determine (e.g., directly determine) location information of the user. In some implementations, the frame rate for accurate tracking using such a system can be at least 60 Hz (e.g., 120 Hz or more).

In some implementations, display 125 can include a switchable transparent lenticular three-dimensional display. Display 125, in such implementations, may allow for placement of the camera assembly 180 behind display 125 to simulate eye contact during the videoconference. In some implementations, display 125 can include organic light emitting diodes (OLEDs) that are small enough to not be easily detected by a human eye or a camera lens thereby making display 125 effectively transparent. Such OLEDs may also be of sufficient brightness such that when they are illuminated, the area for the light they emit is significantly larger than their respective areas. As a result, the OLEDs, while not easily visible by a human eye or a camera lens, are sufficiently bright to illuminate display 125 with a rendered image without gaps in the displayed image. In a switchable transparent lenticular three-dimensional display, the OLEDs may be embedded in a glass substrate such that glass is disposed between consecutive rows of the OLEDs. This arrangement results in display 125 being transparent when the OLEDs are not illuminated but opaque (due to the image displayed on display 125) when illuminated.

In implementations where camera assembly 180 is positioned behind display 125, the camera assembly 180 may not be able to capture visible light and infrared light when the OLEDs are illuminated. In implementations where display 125 includes a switchable transparent lenticular three-dimensional display, processing device 130 may synchronize illumination of the OLEDs of display 125 with camera assembly 180 so that when the OLEDs are illuminated, camera assembly 180 does not capture visible light or infrared light but when the OLEDs are not illuminated, camera assembly 180 captures visible light and infrared light for determining image data, depth data and/or location data consistent with disclosed implementations. Processing device 130 may synchronize illumination of the OLEDs of display 125 with the image capture of camera assembly 180 at a rate faster than detectable by the human eye such as 90 frames per second, for example.

Since display 125 is a lenticular display, if camera assembly 180 were positioned behind a non-switchable transparent lenticular three-dimensional display, the lenticular nature of display 125 may create distortions in the visible light and infrared light captured by camera assembly 180. As a result, in some implementations, display 125 can be a switchable transparent lenticular three-dimensional display. In switchable transparent lenticular three-dimensional display implementations, the microlenses of the microlens array can be made of a first material and a second material. For example, at least some of the microlenses can be made of the first material and at least some of the microlenses can be made from the second material. The first material may be a material that is unaffected (e.g., substantially unaffected) by electrical current while the second material may be affected (e.g., substantially affected) by an electrical current. The first material and the second material may have different indices of refraction when no current is applied to the second material. This can result in refraction at the boundaries between the microlenses of the first material and the second material thereby creating a lenticular display. When a current is applied to the second material, the current may cause the index of refraction of the second material to change to be the same as the index of refraction of the first material, neutralizing the lenticular nature of display 125 such that the two materials form a single rectangular slab of homogenous refraction, permitting the image on the display to pass through undistorted. In some implementations, the current is applied to both the first material and the second material, where the current has the above-described effect on the second material and has no effect on the first material. Thus, when display 125 projects an image (e.g., its OLEDs are illuminated), processing device 130 may not apply a current to the microlens array and the display 125 may function as a lenticular array (e.g., when turned on). When the OLEDs of display 125 are not illuminated and processing device 130 commands the camera assembly 180 to capture visible light and infrared light, processing device 130 may cause a current to be applied to display 125 affecting the microlenses made of the second material. The application of current can change the indices of refraction for the microlenses made of the second material and the display 125 may not function as a lenticular array (e.g., the display 125 may be transparent or function as a clear pane of glass without a lenticular effect).

In some implementations, terminal 120 can include processing device 130. Processing device 130 may perform functions and operations to command (e.g., trigger) display 125 to display images. In some implementations, processing device 130 may be in communication with camera assembly 180 to receive raw data representing the position and location of a user of terminal 120. Processing device 130 may also be in communication with network adapter 160 to receive image data and depth data from other terminals 120 participating in a videoconference. Processing device 130 may use the position and location data received from camera assembly 180 and the image data and depth data from network adapter 160 to render three-dimensional stereoscopic images on display 125, consistent with disclosed implementations.

In some implementations, processing device 130 may perform functions and operations to translate raw data received from camera assembly 180 into image data, depth data, and/or location data that may be communicated to other terminals 120 in a videoconference via network adapter 160. For example, during a videoconference, camera assembly 180 may capture visible light and/or infrared light reflected by a user of terminal 120. The camera assembly 180 may send electronic signals corresponding to the captured visible light and/or infrared light to processing device 130. Processing device 130 may analyze the captured visible light and/or infrared light and determine image data (e.g., data corresponding to RGB values for a set of pixels that can be rendered as an image) and/or depth data (e.g., data corresponding to the depth of each of the RGB values for the set pixels in a rendered image). In some implementations, processing device 130 may compress or encode the image data and/or depth data so that it requires less memory or bandwidth before it communicates the image data or the depth data over network 190. Likewise, processing device 130 may decompress or decode received image data or depth data before processing device 130 renders stereoscopic three-dimensional images.

According to some implementations, terminal 120 can include speaker assembly 140 and microphone assembly 150. Speaker assembly 140 may project audio corresponding to audio data received from other terminals 120 in a videoconference. The speaker assembly 140 may include one or more speakers that can be positioned in multiple locations to, for example, project directional audio. Microphone assembly 150 may capture audio corresponding to a user of terminal 120. The microphone assembly 150 may include one or more speakers that can be positioned in multiple locations to, for example, project directional audio. In some implementations, a processing unit (e.g., processing device 130) may compress or encode audio captured by microphone assembly 150 and communicated to other terminals 120 participating in the videoconference via network adapter 160 and network 190.

Terminal 120 can also include I/O devices 170. I/O devices 170 can include input and/or output devices for controlling the videoconference in which terminal 120 is participating. For example, I/O devices 170 can include buttons or touch screens which can be used to adjust contrast, brightness, or zoom of display 125. I/O devices 170 can also include a keyboard interface which may be used to annotate images rendered on display 125, or annotations to communicate to other terminals 120 participating in a videoconference.

Figure 4:
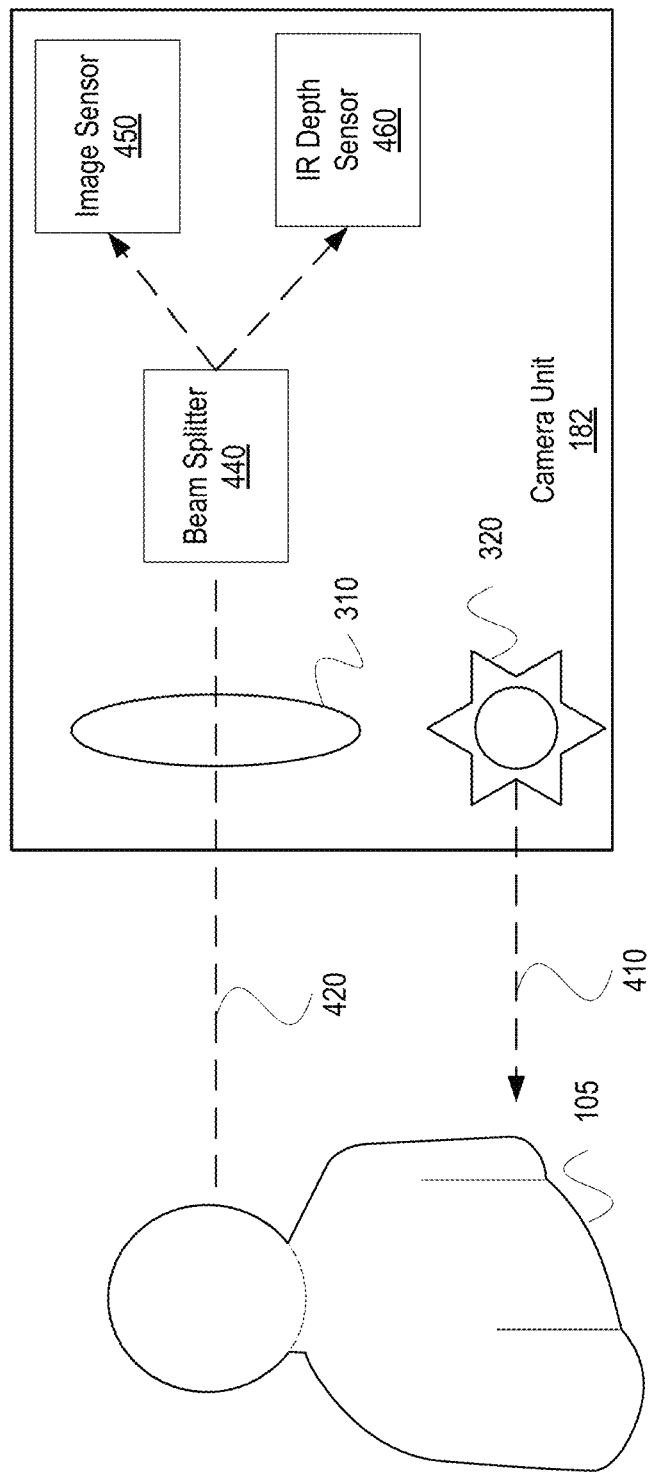
FIG. 4 shows an example camera unit consistent with disclosed implementations.

According to some implementations, terminal 120 includes camera assembly 180. Camera assembly 180 can include one or more camera units. In some implementations, camera assembly 180 includes some camera units that are positioned behind the display 125 and one or more camera units that are positioned adjacent to the perimeter of display 125 (i.e., camera units that are not positioned behind the camera assembly 180). For example, camera assembly 180 can include one camera unit, three camera units, or six camera units. Each camera unit of camera assembly 180 can include an image sensor, an infrared sensor, and/or an infrared emitter. FIG. 4, discussed below, describes one implementation of a camera unit 182 in more detail.

In some implementations, terminal 120 can include memory 185. Memory 185 may be a volatile memory unit or units or nonvolatile memory units or units depending on the implementation. Memory 185 may be any form of computer readable medium such as a magnetic or optical disk, or solid-state memory. According to some implementations, memory 185 may store instructions that cause the processing device 130 to perform functions and operations consistent with disclosed implementations.

In some implementations, terminals 120 of three-dimensional telepresence system 100 communicate various forms of data between each other to facilitate videoconferencing. In some implementations, terminals 120 may communicate image data, depth data, audio data, and/or location data corresponding to each respective user of terminal 120. Processing device 130 of each terminal 120 may use received image data, depth data, and/or location data to render stereoscopic three-dimensional images on display 125. Processing device 130 can interpret audio data to command speaker assembly 140 to project audio corresponding to the audio data. In some implementations, the image data, depth data, audio data, and/or location data may be compressed or encoded and processing device 130 may perform functions and operations to decompress or decode the data. In some implementations, image data may be a standard image format such as JPEG or MPEG, for example. The depth data can be, in some implementations, a matrix specifying depth values for each pixel of the image data in a one-to-one correspondence for example. Likewise, the audio data may be a standard audio streaming format as known in the art and may employ in some implementations voice over internet protocol (VoIP) techniques.

Depending on the implementation, network 190 can include one or more of any type of network, such as one or more local area networks, wide area networks, personal area networks, telephone networks, and/or the Internet, which can be accessed via any available wired and/or wireless communication protocols. For example, network 190 can include an Internet connection through which each terminal 120 communicate. Any other combination of networks, including secured and unsecured network communication links are contemplated for use in the systems described herein.

Figure 3A:
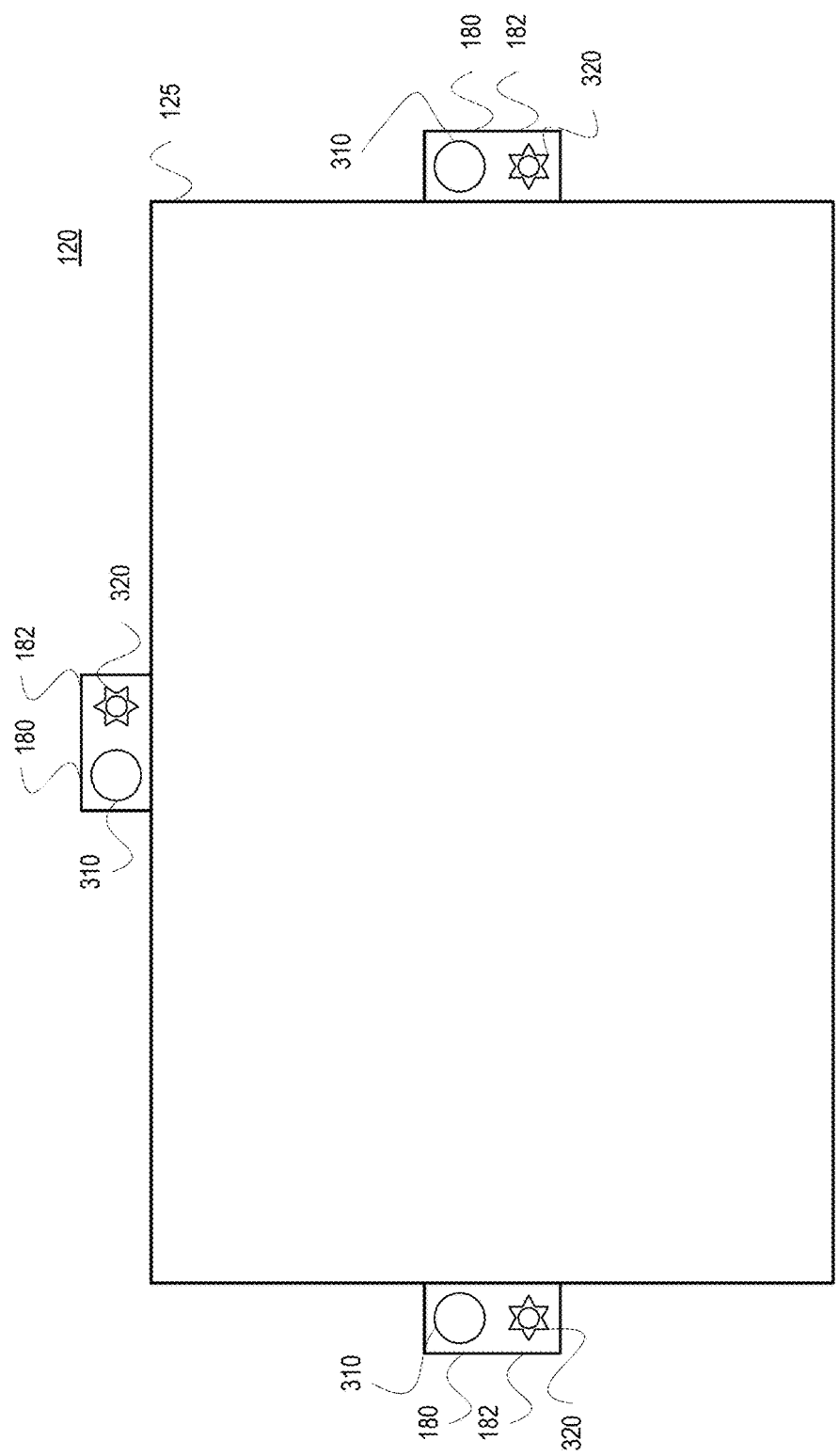
FIGS. 3A and 3B show examples of video conference terminals consistent with disclosed implementations.

FIG. 3A shows one implementation of terminal 120 where camera assembly 180 includes three camera units 182 that are disposed along the perimeter of display 125. The implementation of FIG. 3A, includes three camera units 182, a first disposed on the top of display 125, a second disposed on the left side of display 125, and a third disposed on the right side of display 125. In the implementation of FIG. 3A, display 125 can be a glasses-free lenticular three-dimensional display. According to some implementations, each camera unit 182 of camera assembly 180 can include a lens 310 and an infrared emitter 320. Camera unit 182 uses lens 310 to capture visible light and infrared light corresponding to the user of terminal 120. Infrared emitter 320 may, in some implementations, emit infrared light which is reflected off the user of terminal 120 and the user's surroundings and captured by lens 310 (as discussed in more detail below with respect to FIG. 4).

Figure 3B:
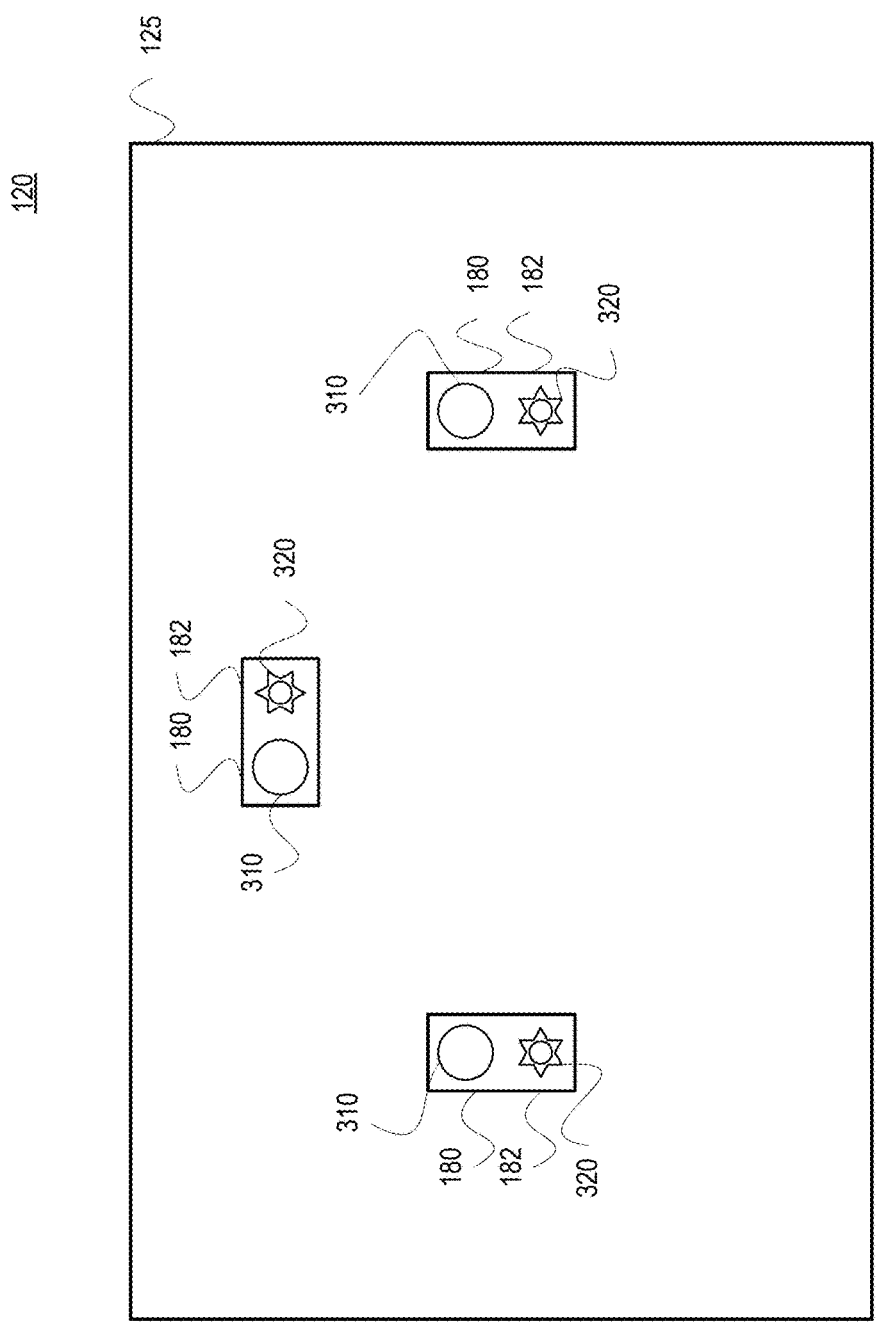

FIG. 3B shows another implementation of terminal 120. In this implementation, display 125 is a glasses-free switchable transparent lenticular three-dimensional display, consistent with disclosed implementations. Also in this implementation, camera assembly 180 may be disposed behind display 125. Disposition of camera assembly 180 behind display 125 can increase the likelihood of direct eye contact during a videoconference because camera units 182 of camera assembly 180 are placed in a position where a user of terminal 120 is most likely to look. In traditional videoconferencing systems, a single camera is typically disposed at the perimeter of the display being viewed by the participant in the videoconference. As a result, eye contact among participants in the videoconference can be inhibited. By using a glasses-free switchable transparent lenticular three-dimensional display, camera assembly 180 can be placed behind the screen, and eye contact during videoconferencing may be increased.

While FIGS. 3A and 3B show some example implementations of camera assembly 180 with multiple camera units 182 disposed at various locations proximate to the display 125, camera units 182 may be disposed at other locations proximate to the display 125 without departing from the spirit and scope of the present disclosure. For example, while the implementation shown in FIGS. 3A and 3B show three camera units 182 disposed proximate to display 125, other implementations may include more or fewer camera units 182. In addition, while the implementations shown in FIGS. 3A and 3B depict camera units 182 of camera assembly 180 at fixed locations, camera units 182 may be adjustable or movable according to some implementations. For example, one or more of the camera units 182 may be connected to movable actuators that adjust the location and/or rotation of that camera unit 182 depending on location data associated with the user of terminal 120.

FIG. 4 shows an example camera unit 182 of the camera assembly 180, sent light path 410 of infrared light sent from infrared emitter 320 of camera assembly 180, and receive light path 420 of visible light and infrared light received by camera assembly 180, in some implementations. Camera unit 182 can include infrared emitter 320, lens 310, beam splitter 440, image sensor 450, and infrared depth sensor 460. According to some implementations, infrared emitter 320 emits an infrared light wave as sent light path 410. Sent light path 410 may reflect off of user 105 and be part of receive light path 420 captured by camera unit 182 via lens 310. In addition, receive light path 420 may also include visible light (e.g., light within the visible color spectrum) via lens 310. Beam splitter 440 may split the captured light and send it to image sensor 450 and infrared depth sensor 460. Image sensor 450 and infrared depth sensor 460 may send raw data corresponding to the frequency and phase of the captured light to processing device 130 in some implementations.

In some implementations, image sensor 450 can be an image sensor capable of capturing visible light and correlating it to red-green-blue (RGB) values, CMYK color values, and/or YUV color values. In some implementations, image sensor 450 can be a high definition (HD) or a 4K resolution image sensor.

In some implementations, infrared emitter 320 and infrared depth sensor 460 can be a time-of-flight emitter and sensor respectfully. In such implementations, infrared emitter 320 sends a sine wave pulse of infrared light. The infrared light may reflect off objects within its path, and be returned to camera assembly 180 and captured by infrared depth sensor 460. In some implementations, infrared depth sensor 460 (or processing device 130 in other implementations) can determine the phase offset between the infrared light sine wave pulse emitted by infrared emitter 320 and the infrared light sine wave pulse detected by infrared depth sensor 460. The phase offset can be used to determine, for example, depth. In some implementations, infrared emitter 320 and infrared depth sensor 460 can be an active stereo, unstructured light stereo, or assistive projected texture (referred to collectively as active stereo for ease of discussion purposes only) emitter and sensor respectfully. In such implementations, infrared emitter 320 emits an unstructured high-frequency texture of infrared light which can reflect off objects within its path and be returned to camera assembly 180. In active stereo implementations, infrared depth sensors 460 from multiple camera units may be needed to calculate the depth of objects. In some implementations, infrared emitter 320 and infrared depth sensor 460 can be a coded light stereo emitter and sensor respectfully. In coded light stereo implementations, infrared emitter 320 produces a specific pattern of light that can be used to perform stereo triangulation to determine depth of points within its captured image.

According to some implementations, beam splitter 440 splits incoming light so that image sensor 450 and infrared depth sensor 460 receive the same light. In some implementations, image sensor 450 and infrared depth sensor 460 have the same, or substantially the same, geometry such that a visible light frequency corresponding to a point within the geometry of image sensor 450 corresponds directly to an infrared light frequency corresponding to a point within geometry of infrared depth sensor 460. As a result, an RGB value for a pixel within an image captured by image sensor 450 has a one-to-one correspondence as a depth value for a corresponding pixel at the same location within the image captured by infrared depth sensor 460. In some implementations, the images captured by image sensor 450 and infrared depth sensor 460 can be used to create a depth mesh for the RGB image captured by image sensor 450. And, as the geometries of image sensor 450 and infrared depth sensor 460 are the same, the depth mesh can be created without any, or with limited, calibration.

Figure 5:
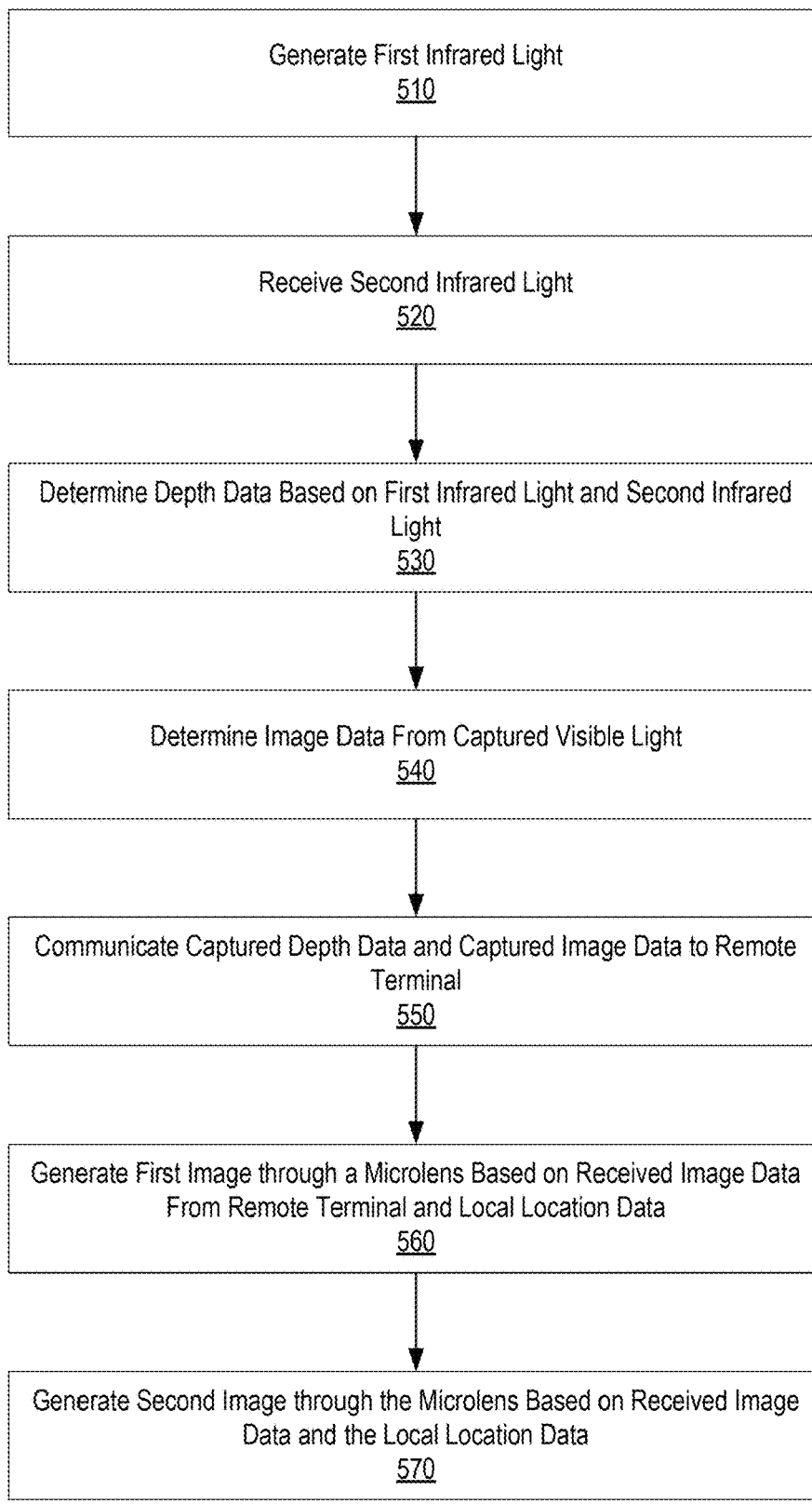
FIG. 5 shows a flow chart for a process for generating a three-dimensional image on a video conferencing terminal consistent with disclosed implementations.

FIG. 5 shows a flowchart representing an example image display process 500 for generating a three-dimensional stereoscopic image on a video conferencing terminal consistent with disclosed implementations. According to some implementations, image display process 500 can be performed by one or more components of a videoconference terminal such as terminal 120. Although the following discussion describes image display process 500 as being performed by a videoconference terminal, other components of a computer system configured to generate three-dimensional images on a videoconference terminal can perform image display process 500 without departing from the spirit and scope of the present disclosure.

At step 510, an infrared emitter of a camera unit of the local terminal generates first infrared light. The first infrared light may reflect off of objects within its path. The camera unit of the local terminal may receive the reflected infrared light at step 520. An infrared depth sensor within the camera unit may capture the received second infrared light and provide raw data to a processing unit of the local terminal which determines depth data based on a difference between the first infrared light and the second infrared light, at step 530. In some implementations, step 530 may be performed by the infrared depth sensor or some other component of terminal 120. In some implementations, the depth data is determined based on a time-of-flight method which measures the phase offset between the first infrared light and the second infrared light, while in some other implementations different techniques such as active stereo or coded light stereo may be used.

At step 540, the local terminal determines image data from captured visible light. In some implementations, an image sensor that is part of the camera unit of the local terminal may capture the visible light and determine image data from it. In some implementations, the image sensor may determine raw data corresponding to the captured visible light which is communicated to a processing unit of the local terminal (e.g., graphical processing unit 130) to determine the image data. In some implementations, step 540 is performed simultaneously with one or more of steps 510, 520, and 530.

At step 550, the local terminal may communicate the captured depth data and the captured image data to a remote terminal. The local terminal may receive depth data and image data from the remote terminal and it may use it to generate a three-dimensional stereoscopic image that includes a first image (which may correspond to the left eye for example) and a second image (which may correspond to the right eye for example). At step 560, the terminal may generate the first image through a microlens of a microlens array that makes up the display of the local terminal. The first image may be based on the received image data and local location data. The local terminal may also generate a second image through the microlens of the microlens array that make up the display of the local terminal at step 570. The second image may be based on both the received image data and the local location data. The local location data can indicate a location of a viewer (e.g., an eye of the viewer) with respect to the local terminal. In at least some implementations, the first image and the second image may be generated based at least in part on received depth data from the remote terminal. In some implementations, steps 560 and 570 are performed in a different order or simultaneously.

In some implementations, terminal 120 can include a dedicated computing device hardwired to display 125. In such implementations, processing device 130, speaker assembly 140, microphone assembly 150, network adapter 160, I/O devices 170, and memory 185 may be disposed within the same housing as display 125, or connected to display 125 such that they cannot be removed with ease by users (e.g., the connections are soldered together or the connections cannot be disconnected without opening the housing of display 125). In some implementations, the functionality performed by processing device 130, speaker assembly 140, microphone assembly 150, network adapter 160, I/O devices 170, and memory 185 may be performed by an external general purpose computing device connected to display 125 and camera assembly 180. In such implementations, the general purpose computing device can perform the operations consistent with disclosed implementations of the three-dimensional telepresence system and may send electronic signals to display 125 to "drive" the display to generate three-dimensional images.

Although the process 500 is shown and discussed in a particular order, this process is not limited to that particular order and some implementations perform at least some of the steps of the process 500 in a different order. Additionally, in some implementations, various of the steps of process 500 are performed simultaneously.

Figure 6:
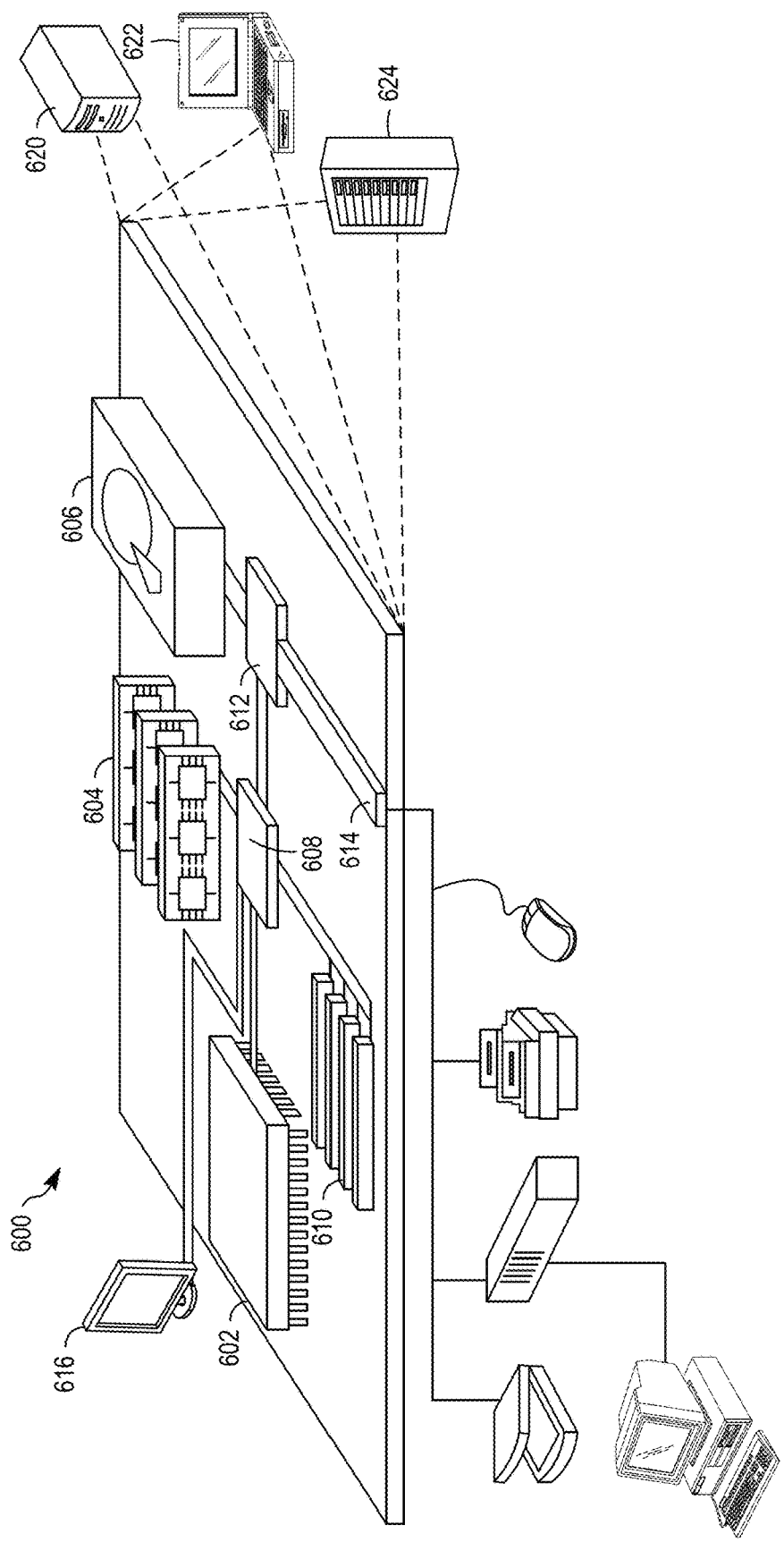
FIG. 6 shows an example computer device that can be used to implement the techniques consistent with disclosed implementations.

FIG. 6 shows an example of a generic computer device 600 that may be used with the techniques described here. Computing device 600 is intended to represent various forms of digital computers, such as laptops, desktops, tablets, workstations, personal digital assistants, televisions, servers, blade servers, mainframes, and other appropriate computing devices. The components shown here, their connections and relationships, and their functions, are meant to be exemplary only, and are not meant to limit implementations of disclosed implementations.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. The processor 602 can be a semiconductor-based processor. The memory 604 can be a semiconductor-based memory. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown). Each of such devices may contain one or more of computing device 600, and an entire system may be made up of multiple computing devices 600 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Figure 7A:
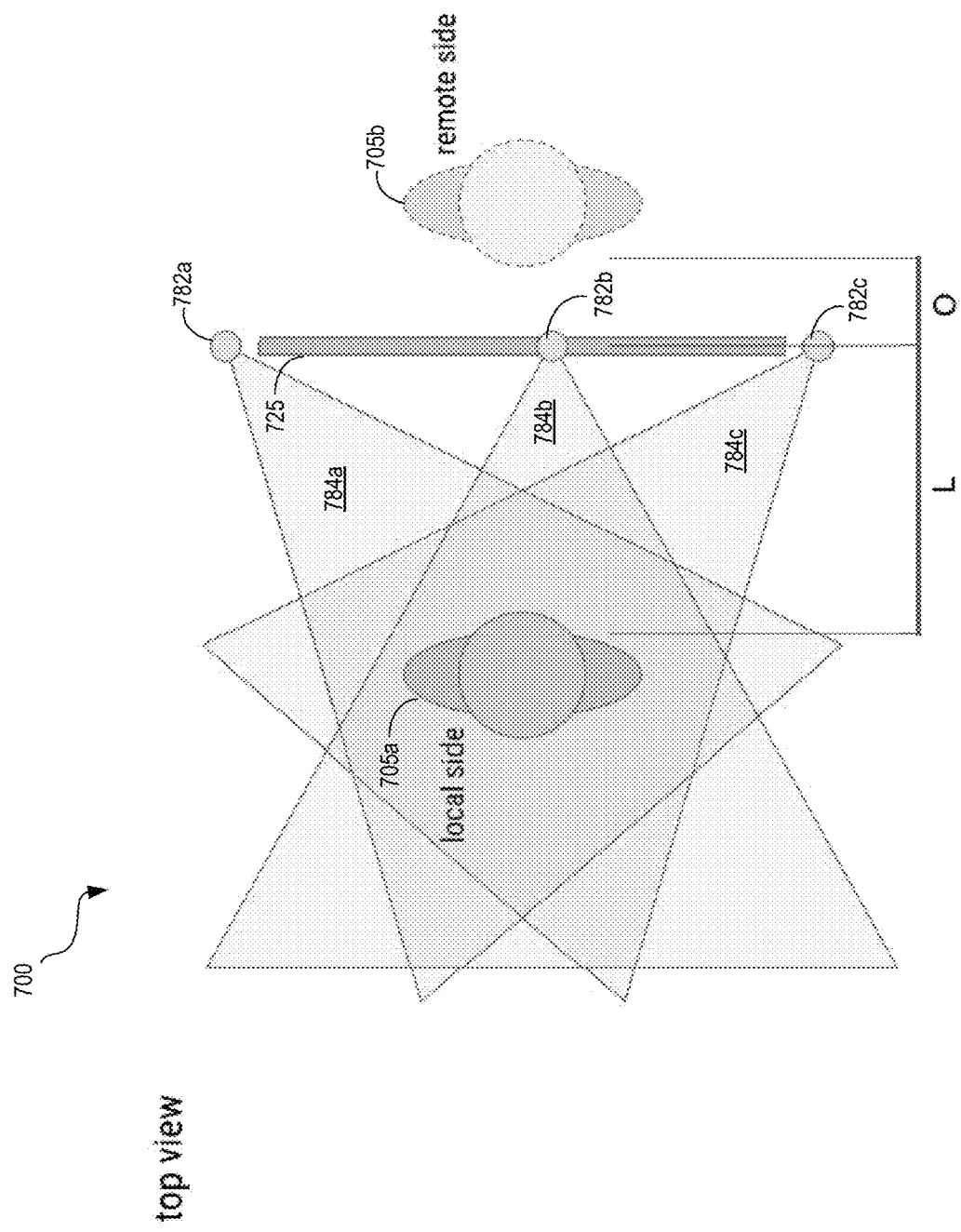
Figure 7B:
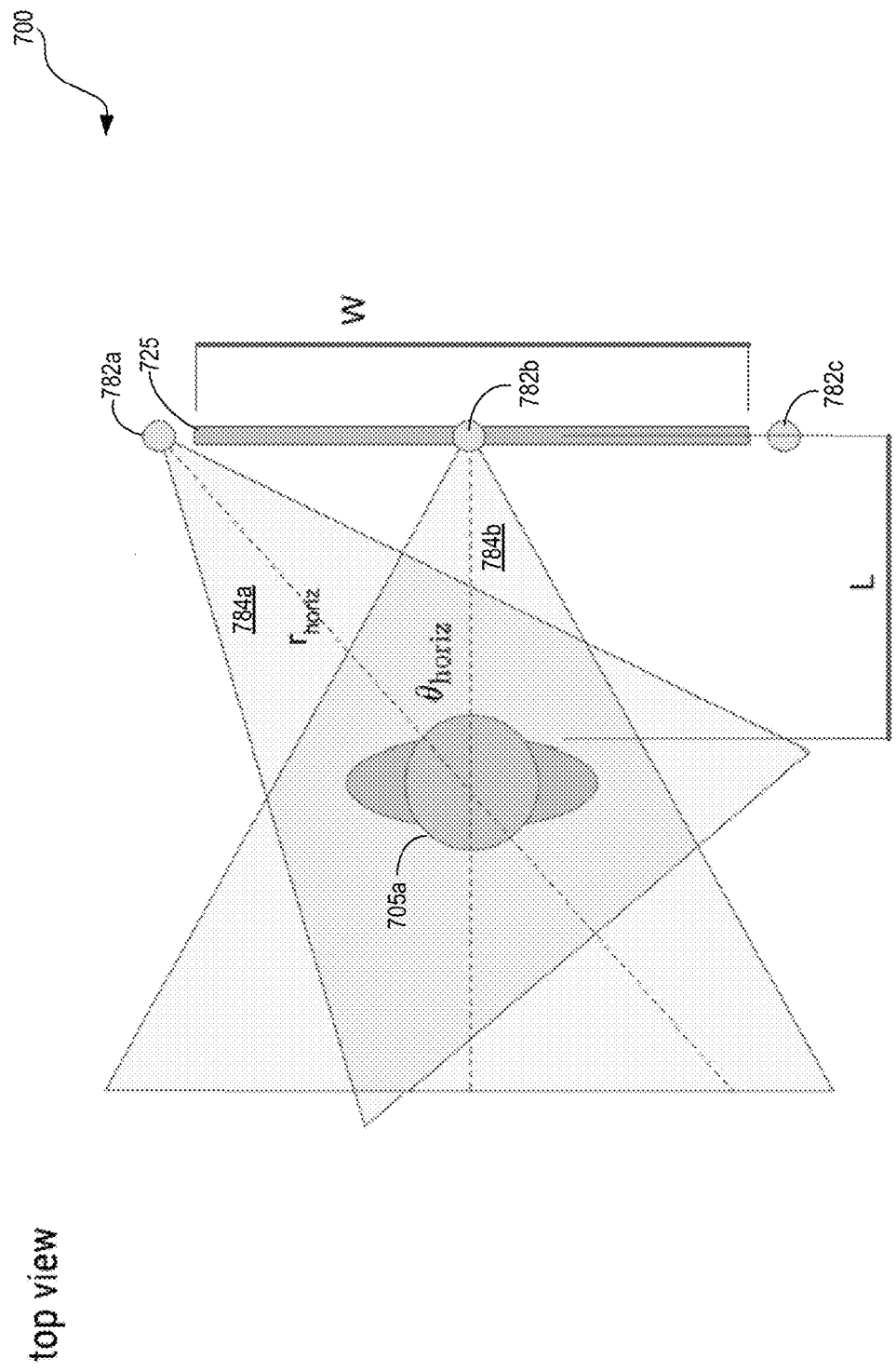
Figure 7D:
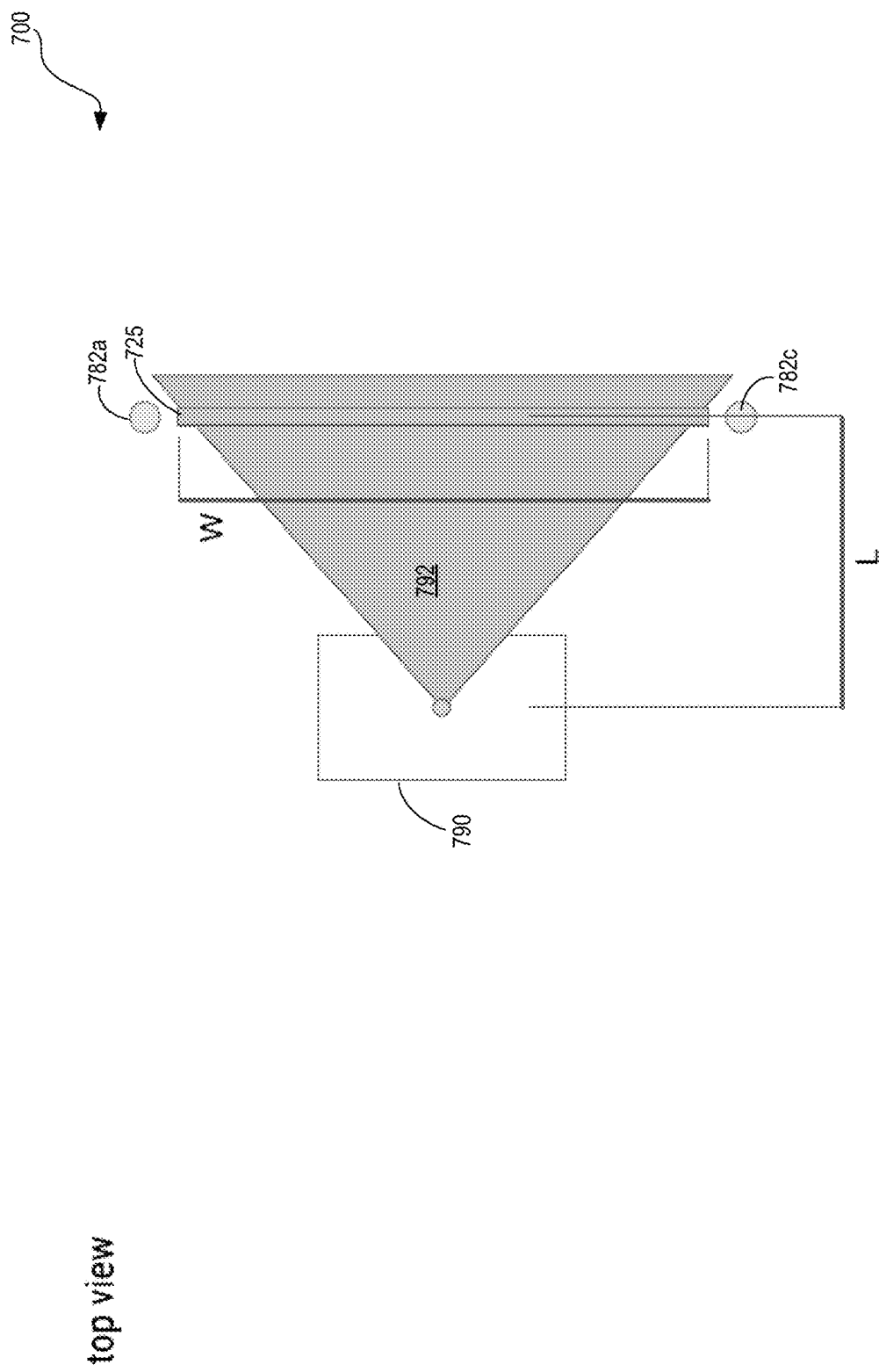
Figure 7E:
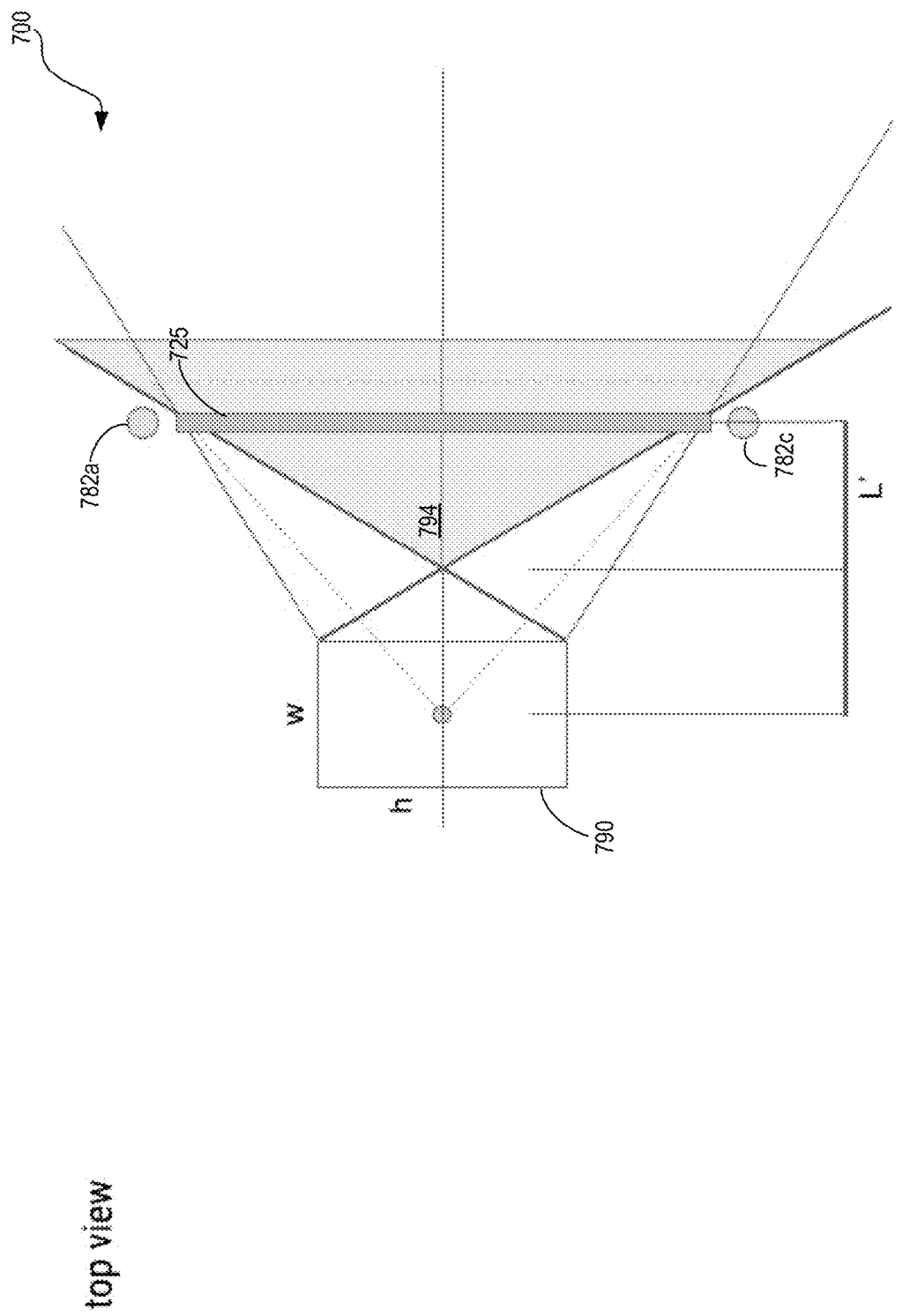
Figure 7F:
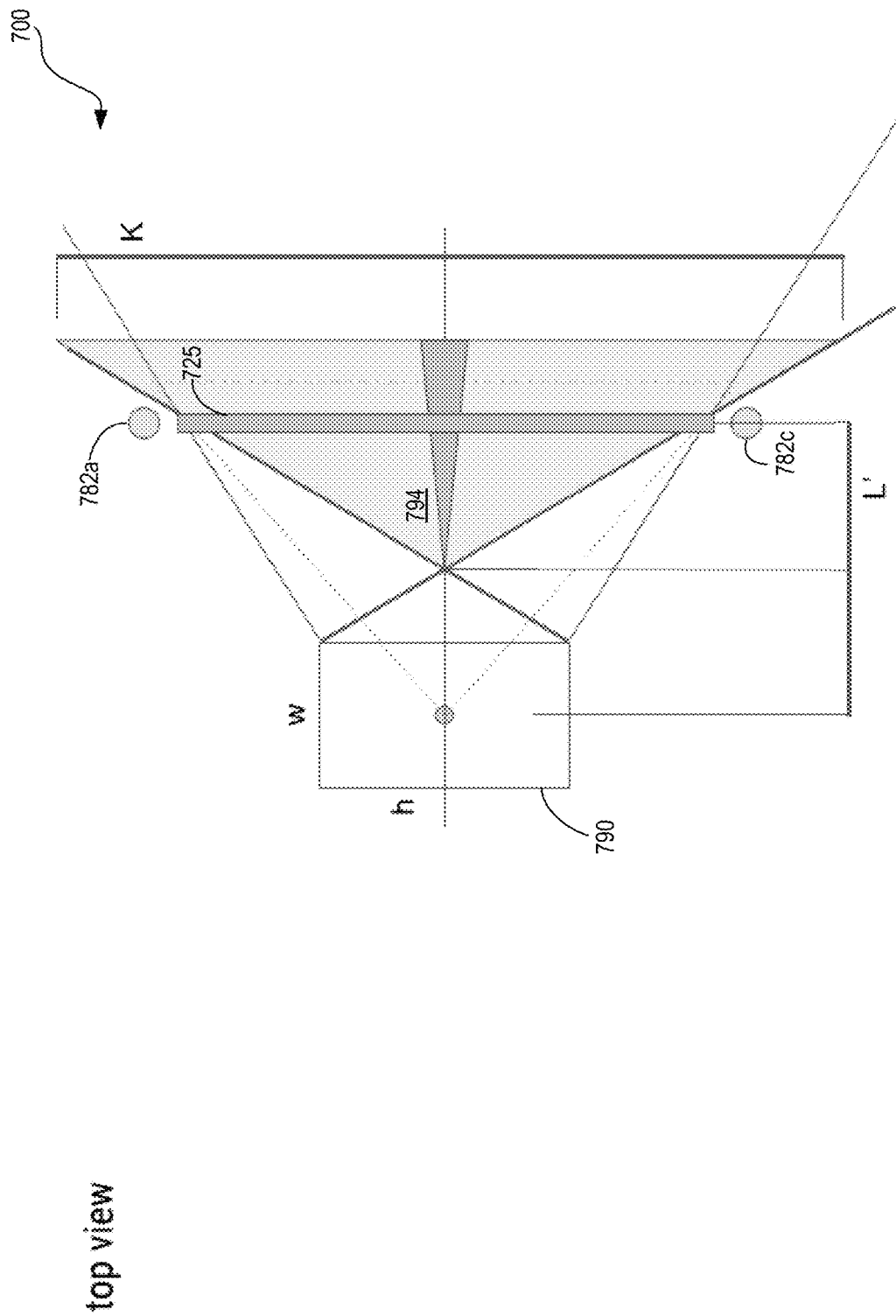
Figure 7G:
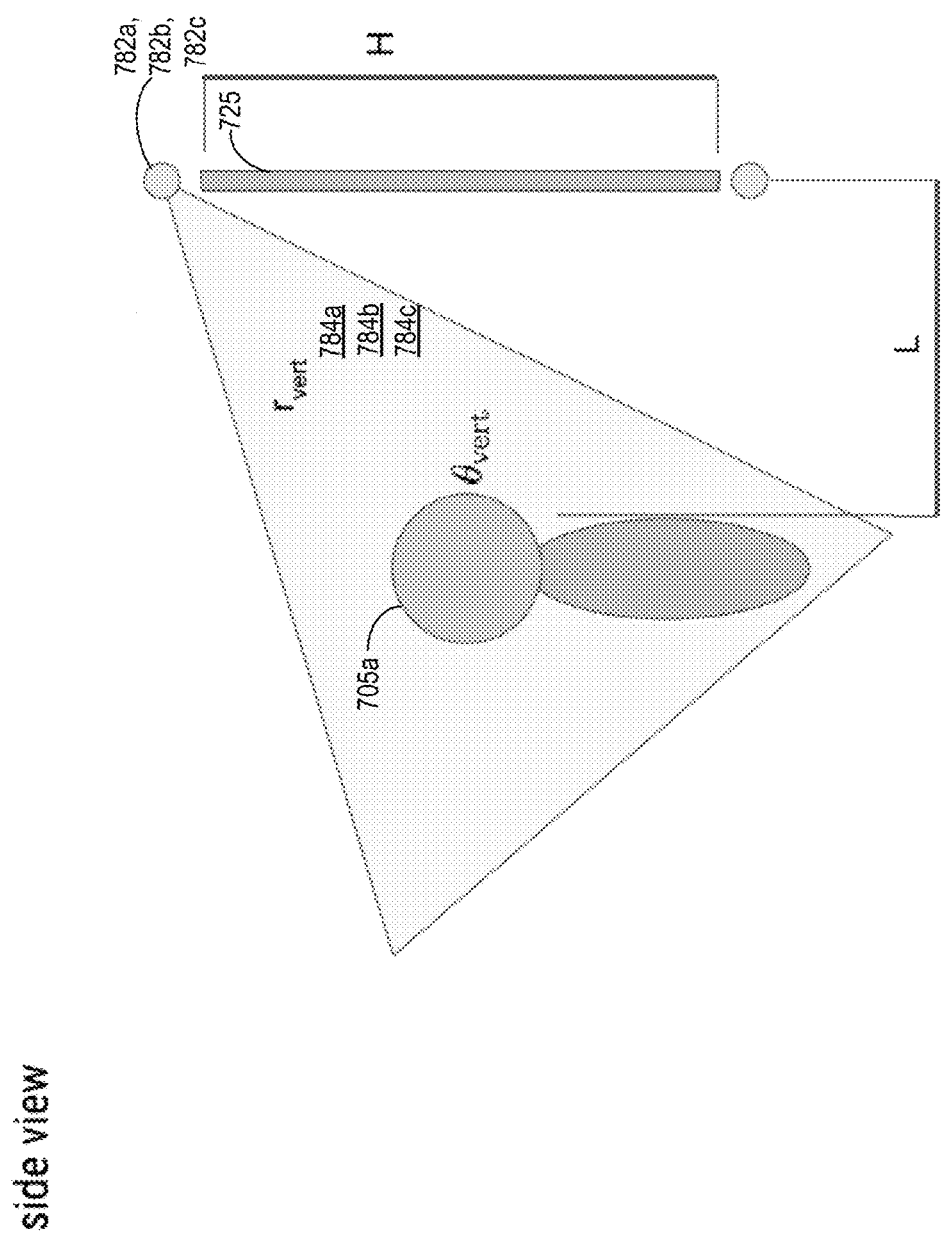

FIGS. 7A through 7G are schematic diagrams of example implementations of a three-dimensional telepresence system 700. The three-dimensional telepresence system 700 is an example of the three-dimensional telepresence system 100. FIGS. 7A-7F are top views of the system 700. FIG and FIG. 7G is a side view.

The three-dimensional telepresence system 700 includes a display 725, and a camera assembly that includes camera units 782a, 782b, and 782c. A local participant 705a and a remote participant are participating in a videoconference using the three-dimensional telepresence system 700. A representation 705b of the remote participant is generated by the display 725. The three-dimensional capabilities of the display 725 can generate the representation 705b so that the remote participant appears, at least to the local participant 705a, to be positioned on the opposite of the display 725 from the local participant 705a.

In some implementations, the display 725 may include a 4K lenticular display screen that provides an effective resolution of approximately 1920×1080. Other actual and effective resolutions are possible as well. The display 725 may have a width W of 1.3 meters. In some implementations, the display 725 has a width W of 1-1.5 meters. In some implementations, the display 725 has a width W of between 0.5 and 2 meters. The display 725 may have a width of less than 0.5 meters or greater than 2 meters in some implementations.

The display 725 may be configured to receive and display graphical data that includes color and depth values (e.g., RGB+D). In some implementations, the display 725 is configured to capture the local participant in a window around a point located at a distance L from the display 725. For example, in some implementations L is 1 meter, approximately 1 meter, 1.2 meters, or another distance. The display 725 may also be configured to generate the representation of the remote participant so as to appear to be an offset distance O behind the display 725. In some implementations, the offset distance O is 0.2 meters, approximately 0.2 meters, 0.3 meters, or another distance.

As shown in the figures, the camera units 782a, 782b, and 782c have corresponding field of views 784a, 784b, and 784c. The field of views 784a, 784b, and 784c may a horizontal angle of view (indicated at $\theta_{horiz}$) and a horizontal range (indicated at $r_{horiz}$) corresponding to the focal length of the camera units. The horizontal range may correspond to the distance from the camera within which the local participant 705a should be positioned to allow for adequate image and depth capture by the camera units. In some implementations, the camera units 782a, 782b, and 782c are configured to have same horizontal angles of view and horizontal ranges. In some implementations, the horizontal angle of view is 57 degrees. In some implementations, the horizontal angle of view is between 55 and 60 degrees. Additionally, the horizontal angle of view may be between 45 and 70 degrees. Other implementations may include camera units configured with different horizontal angles of view too. The horizontal range is equal to or approximately equal to 1.2 meters in some implementations. In some implementations, the horizontal range is between 1 meter and 1.5 meters. The horizontal range may be greater than 0.5 meters and less than 2 meters. Other horizontal ranges are possible too.

Various horizontal depth sample spacings (indicated at d) can be supported by various configuration of the system 700. The horizontal depth sample spacing corresponds to horizontal distance on the remote side between depth values used to generate 3-D images on the display 725. For example, various aspects of the implementation of the system 700 may impact the horizontal depth sample spacing. Some implementations have a horizontal depth sample spacing of 0.8 millimeters; however, other implementations have other horizontal depth sample spacings. In some implementations, the horizontal depth sample spacing can be calculated using the following equation:

$$d = \frac{L+O}{L} \frac{W}{R}$$

where:
L=the distance from the eye of the local participant 705a to the display 825;
O=the projected offset distance from the display 725 to the representation of the remote participant;
W=the width of the display 725; and
R=the effective horizontal resolution of the display 725.
For example, in some implementations, the system 700 may be configured to generate a first image and a second image on the lenticular display, where the second display image is generated to differ from the first image to create a parallax effect for the user that causes a representation of the remote participant to appear at an offset distance behind the display device. In some implementations, the offset distance is determined based on a target depth sample spacing. In some implementations, one or more infrared depth sensors (e.g., of the camera units 782a, 782b, or 782c) may be configured to collect depth samples at a depth sampling rate to support a target offset distance. For example, the depth data may be collected with a horizontal depth sample spacing that is calculated based on a target distance from the display to the user, the offset distance to the representation of the remote participant, the width of the display, and the effective horizontal resolution of the display (e.g., according to the equation shown above).

In some implementations, the system 700 may define a headbox 790 in which the local participant 705a's head should be positions. The headbox 790 may, for example, be a region of the physical space in which the display 725 can be viewed and the field of views of the camera units 782a, 782b, and 782c overlap to allow image and/or depth capture of the local participant 705a. In some implementations, the headbox 790 may have a height (indicated at h) of 0.6 m and a width indicated at w) of 0.6 m. Other implementations may have a headbox 790 with a different height and/or width. Typically, the borders of the headbox 790 are not physically defined, but may be indicated to the local participant 705a on the display 725 using various techniques (e.g., a displaying a warning when the local participant 705a's head leaves the headbox 790).

In some implementations, a field of view 792 for the local participant 705a when measured from the center of the headbox 790 has an angle of view of approximately 66 degrees. In other implementations, the angle of view for the field of view 792 is between 50-80 degrees. Other angles of view are possible too. In some implementations, the effective field of view 794 for the local participant 705a is expanded based on the local participant 705a's field of view being different from different positions within the headbox 790. For example, in some implementations, the effective field of view 794 is approximately 107 degrees. Some implementations, the display 725 has a higher resolution so support a minimum horizontal depth sample spacing over the larger horizontal width (indicated at K) of the effective field of view 794. For example, some implementations of the system include a display 725 with an effective horizontal resolution of at least approximately 2270 pixels.

As shown in FIG. 7G, the display 725 has a height H. In some implementations, the height H is equal to 0.8 meters, or is approximately equal to 0.8 meters. In some implementations, the height H is between 0.5-1.5 meters. In other implementations, the height H may be less than 0.5 meters or greater than 1.5 meters.

The camera units 782a, 782b, and 782c have corresponding field of views 784a, 784b, and 784c. The field of views 784a, 784b, and 784c may have a vertical angle of view (indicated at $\theta_{vert}$) and a vertical range (indicated at $r_{vert}$) corresponding to the focal length of the camera units. The vertical range may correspond to the vertical distance from the camera within which the local participant 705a should be positioned to allow for adequate image and depth capture by the camera units. In some implementations, the camera units 782a, 782b, and 782c are configured to have same vertical angles of view and vertical ranges. In some implementations, the vertical angle of view is 68 degrees. In some implementations, the vertical angle of view is between 65 and 75 degrees. Additionally, the vertical angle of view may be between 50 and 80 degrees. Other implementations may include camera units configured with different vertical angles of view too. The vertical range is equal to or approximately equal to 1 meter in some implementations. In some implementations, the vertical range is between 0.5 and 1.5 meters. The vertical range may be less than 0.5 meters or greater than 1.5 meters. Other vertical ranges are possible too.

Figure 8:
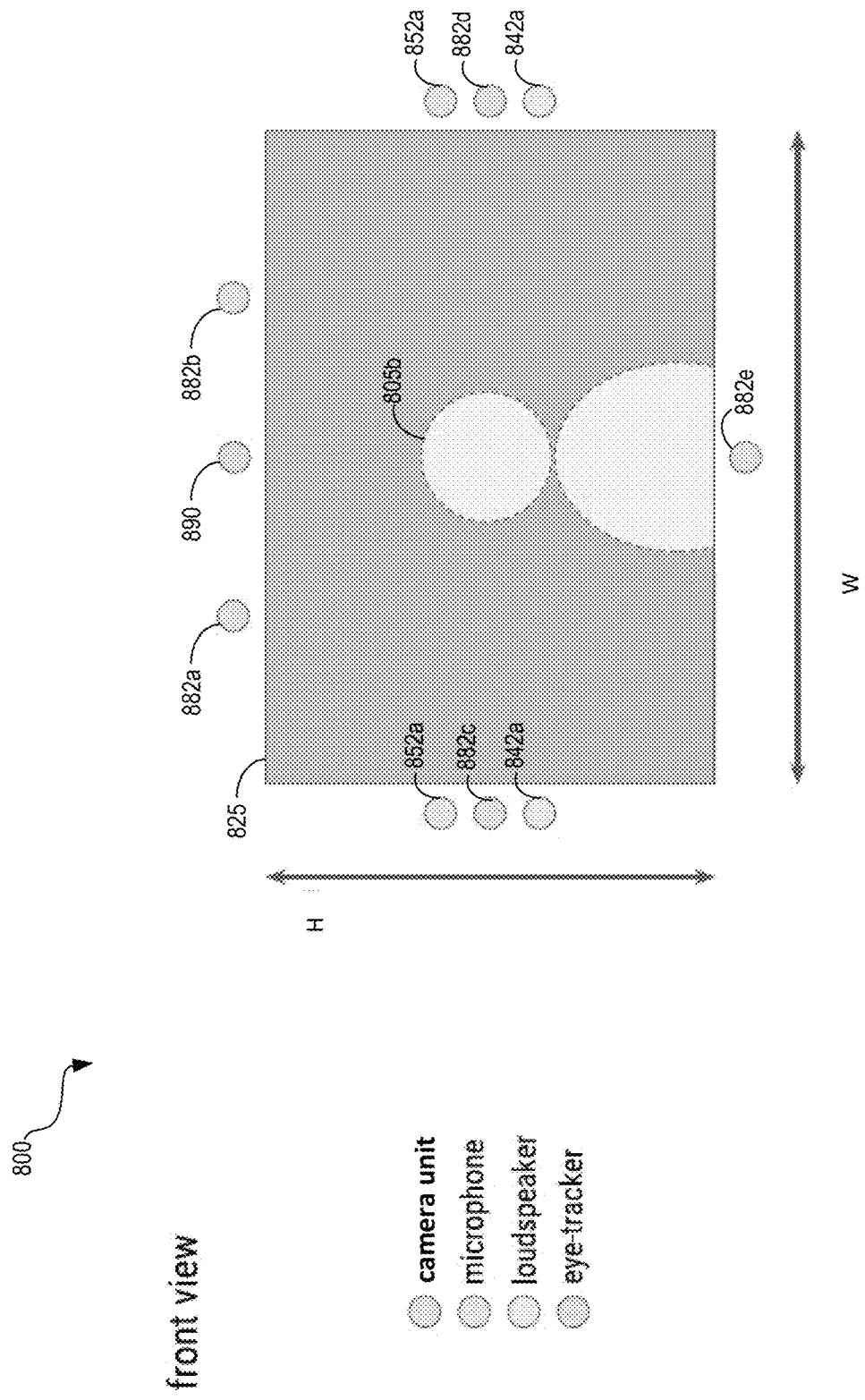
FIG. 8 is a schematic diagram of a three-dimensional telepresence system according to implementations.

FIG. 8 is a schematic diagram of an example implementation of a three-dimensional telepresence system 800. The three-dimensional telepresence system 800 is an example of the three-dimensional telepresence system 100.

In some implementations, the system 800 includes a display 825; a camera assembly that has a camera unit 882a, 882b, 882c, 882d, and 882e; a speaker assembly including speakers 842a and 842b; a microphone assembly including microphones 852a and 852b, and an eye tracking module 890. For example, the camera units can be disposed at different positions around the display 825. In the example shown, camera units 882a and 82b are positioned above the display 825, camera unit 882c is positioned on one side of the display 825, camera unit 882 is positioned on the other side of the display 825, and camera unit 882e is positioned below the display 825. In some implementations, the speakers and microphones are positioned in various locations to allow for recording and generating directional or spatial audio. For example, the speaker 842a and the microphone 852a are positioned on one side of the display 825, and the speaker 842b and the microphone 852b are positioned on the other side of the display 825. In some implementations, the microphone assembly includes more than two microphones (e.g., four microphones). Similarly, in some implementations, the speaker assembly includes more than two speakers (e.g., four speakers).

The eye tracking module 890 may be positioned in various positions around the display 825. The eye tracking module 890 may include one or more cameras or other types of imaging devices that are configured to identify the eye location/position of a local participant (not shown) and/or a gaze direction or target for the local participant. The eye tracking module 890 may also track other features of the user such as the mouth or other facial features. Additionally, in some implementations, the eye tracking module includes a camera that operates at a higher frame rate relative to the camera units 882a, 882b, 882c, 882d, and 882e of the camera assembly. Additionally or alternatively, the camera units of the camera assembly may perform eye tracking.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

What is claimed is:

1. A telepresence terminal comprising:
    a display that includes a microlens array disposed in front of a grid of pixels;
    an image sensor;
    an infrared emitter;
    an infrared depth sensor;
    a processing device; and
    a memory storing instructions that when executed cause the processing device to perform operations including:
        determining image data based on visible light captured by the image sensor;
        determining depth data based on infrared light transmitted by the infrared emitter and captured by the infrared depth sensor;
        determining a location of a user of the telepresence terminal;
        communicating the depth data and the image data to a remote telepresence terminal;
        receiving remote image data and remote depth data, the remote image data and remote depth data originating from a remote telepresence terminal;
        generating a first display image based on the remote image data using a first subset of pixels of the grid of pixels that is viewable through the microlens array from a first viewing location; and
        generating a second display image based on the remote image data and the remote depth data using a second subset of pixels of the grid of pixels that is viewable through the microlens array from a second viewing location, the first display image and the second display image being generated to simulate parallax based on the determined location of the user, the simulated parallax causing a representation of a remote user at the remote telepresence terminal to appear at an offset distance behind the microlens array.

2. The telepresence terminal of claim 1, wherein the location of the user of the telepresence terminal is determined based on the depth data.

3. The telepresence terminal of claim 1, wherein the location of the user of the telepresence terminal is determined based on the image data.

4. The telepresence terminal of claim 1, further comprising:
    a microphone assembly including a first microphone positioned on a first side of the display and a second microphone positioned on a second side of the display; and
    a speaker assembly including a first speaker positioned on the first side of the display and a second speaker positioned on the second side of the display;
    wherein the instructions further cause the processing device to perform operations comprising:
        capturing directional audio data using the microphone assembly;
        transmitting the directional audio data to the remote terminal;
        receiving remote directional audio data from the remote terminal; and
        outputting audio using the speaker assembly based on the remote directional audio data.

5. The telepresence terminal of claim 4, wherein the microphone assembly includes more than two microphones.

6. The telepresence terminal of claim 1, wherein the telepresence terminal comprises a camera assembly comprising at least one camera unit positioned behind the display, wherein the camera unit includes the image sensor, the infrared emitter and the infrared depth sensor.

7. The telepresence terminal of claim 6, wherein the display is transparent and is switchable between an off state and an illuminating state and wherein the instructions further cause the processing device to perform operations comprising synchronizing capture of visible light and infrared light with the off state of the display.

8. The telepresence terminal of claim 7, wherein at least some microlenses of the microlens array are made of a first material and at least some of the microlenses of the microlens array are made of a second material, the first material being a material that is substantially unaffected by electrical current and the second material being a material that is substantially affected by an electrical current and the first material and the second material having different indices of refraction when no current is applied to the first and second materials.

9. The telepresence terminal of claim 1, further comprising a beam splitter splitting incoming light and sending the split incoming light to the image sensor and the infrared depth sensor.

10. A method comprising:
generating first infrared light using an infrared emitter of a telepresence terminal;
receiving second infrared light using an infrared depth sensor of the telepresence terminal;
determining captured depth data based on the first infrared light and the second infrared light;
determining captured image data based on visible light captured by an image sensor;
determining a location of a user of the telepresence terminal;
communicating the captured depth data and the captured image data to a remote terminal;
generating a first display image based on received image data originating from the remote terminal using a first subset of a grid of pixels, the first display image being viewable through a microlens array from a first location; and
generating a second display image based on the received image data and received depth data originating from the remote terminal using a second subset of a grid of pixels, the second display image being viewable through the microlens array from a second location, the second display image being generated to differ from the first display image to create a parallax effect based on a combination of the determined location of the user and the received depth data, the parallax effect causing a representation of a remote user at the remote terminal to appear at an offset distance behind the microlens array.

11. The method of claim 10, further comprising:
capturing directional audio data using a microphone assembly;
transmitting the directional audio data to the remote terminal;
receiving remote directional audio data from the remote terminal; and
outputting audio using a speaker assembly based on the remote directional audio data.

12. The method of claim 10, wherein receiving second infrared light using an infrared depth sensor comprises:
switching off the microlens array and grid of pixels;
capturing the second infrared light through the microlens array and grid of pixels; and
switching on the microlens array and grid of pixels.

13. A non-transitory computer-readable storage medium comprising instructions stored thereon that, when executed by at least one processor, are configured to cause a computing system to at least:
generate first infrared light using an infrared emitter of a telepresence terminal;
receive second infrared light using an infrared depth sensor of the telepresence terminal;
determine depth data based on the first infrared light and the second infrared light;
determine image data based on visible light captured by an image sensor;
determine a location of a user of the telepresence terminal;
communicate the depth data and the image data to a remote telepresence terminal;
generate using a lenticular display of the telepresence terminal a first display image based on received image data originating from the remote terminal, the first display image being viewable from a first location; and
generate using the lenticular display a second display image based on the received image data and received depth data originating from the remote terminal, the second display image being viewable from a second location and being generated to differ from the first display image to create a parallax effect based on a combination of the determined location of the user and the received depth data, the parallax effect causing a representation of a remote user at the remote telepresence terminal to appear at an offset distance behind the lenticular display.

14. The non-transitory computer-readable storage medium of claim 13, wherein the offset distance is determined based on a target depth sample spacing.

15. The non-transitory computer-readable storage medium of claim 14, wherein the depth data is collected with a horizontal depth sample spacing (d) that is calculated based on a target distance from the display to the user (L), the offset distance (O), a width of the display (W), and an effective horizontal resolution of the display (R).

16. The non-transitory computer-readable storage medium of claim 15, wherein the horizontal depth sample spacing d is calculated as $$d = \frac{L+O}{L}\frac{W}{R}.$$

* * * * *